United States Patent [19]
Boutet

[11] Patent Number: 5,691,535
[45] Date of Patent: Nov. 25, 1997

[54] GANGED LASER SCANNING SYSTEM WHICH CORRECTS BEAM ALIGNMENT ALONG A BOW-TIE PATH

[75] Inventor: John C. Boutet, Rochester, N.Y.

[73] Assignee: Eastman Kodak Company, Rochester, N.Y.

[21] Appl. No.: 598,456

[22] Filed: Feb. 8, 1996

[51] Int. Cl.$^6$ ............................................. G01T 1/105
[52] U.S. Cl. ........................... 250/234; 250/585; 358/474
[58] Field of Search .......................... 250/234, 585, 250/583, 582, 581, 580; 359/214; 358/471, 474, 480

[56] References Cited

U.S. PATENT DOCUMENTS

| | | | |
|---|---|---|---|
| 4,352,984 | 10/1982 | Ohara | 250/234 |
| 4,681,394 | 7/1987 | Noguchi | 350/6.6 |
| 4,689,482 | 8/1987 | Horikawa et al. | 250/205 |
| 4,924,321 | 5/1990 | Miyagawa et al. | 358/296 |
| 5,122,659 | 6/1992 | Agano | 250/585 |
| 5,488,489 | 1/1996 | Miyagawa | 358/474 |

*Primary Examiner*—David C. Nelms
*Assistant Examiner*—Alan L. Giles
*Attorney, Agent, or Firm*—William F. Noval

[57] ABSTRACT

A method and apparatus for combining several laser systems, forming a ganged laser assembly and measuring and correcting vertical and horizontal displacements, and reducing spot size variations. The combined laser beams are scanned in a bow-tie path on a continuously moving medium.

25 Claims, 28 Drawing Sheets

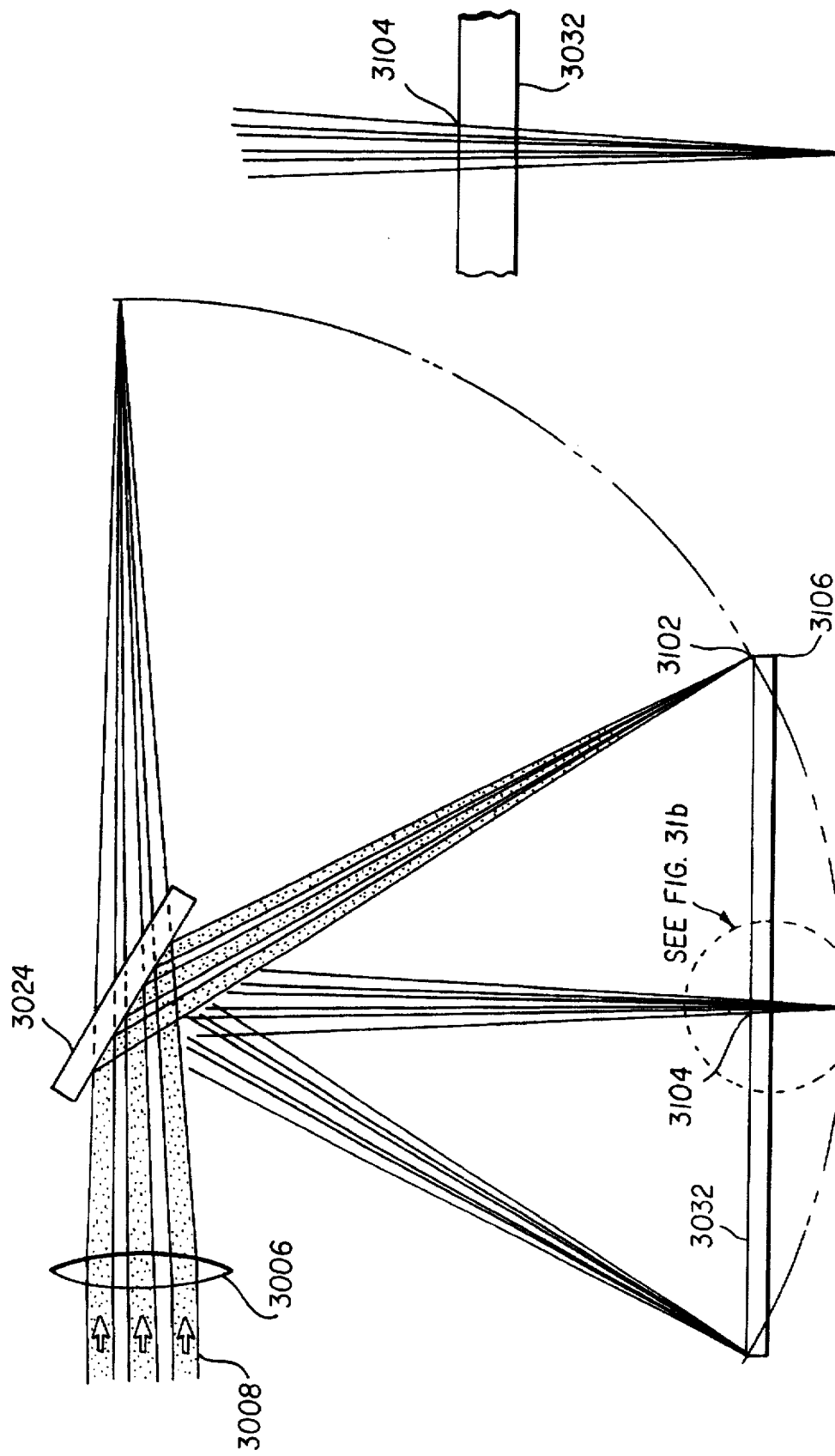

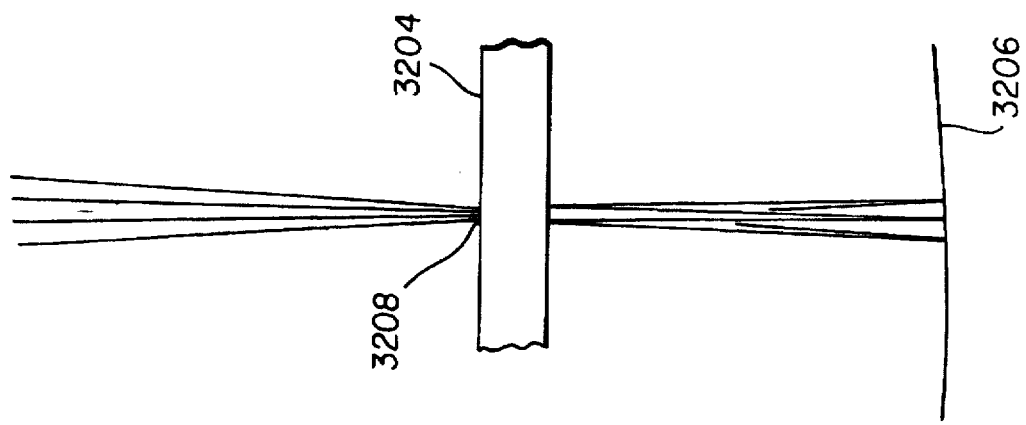
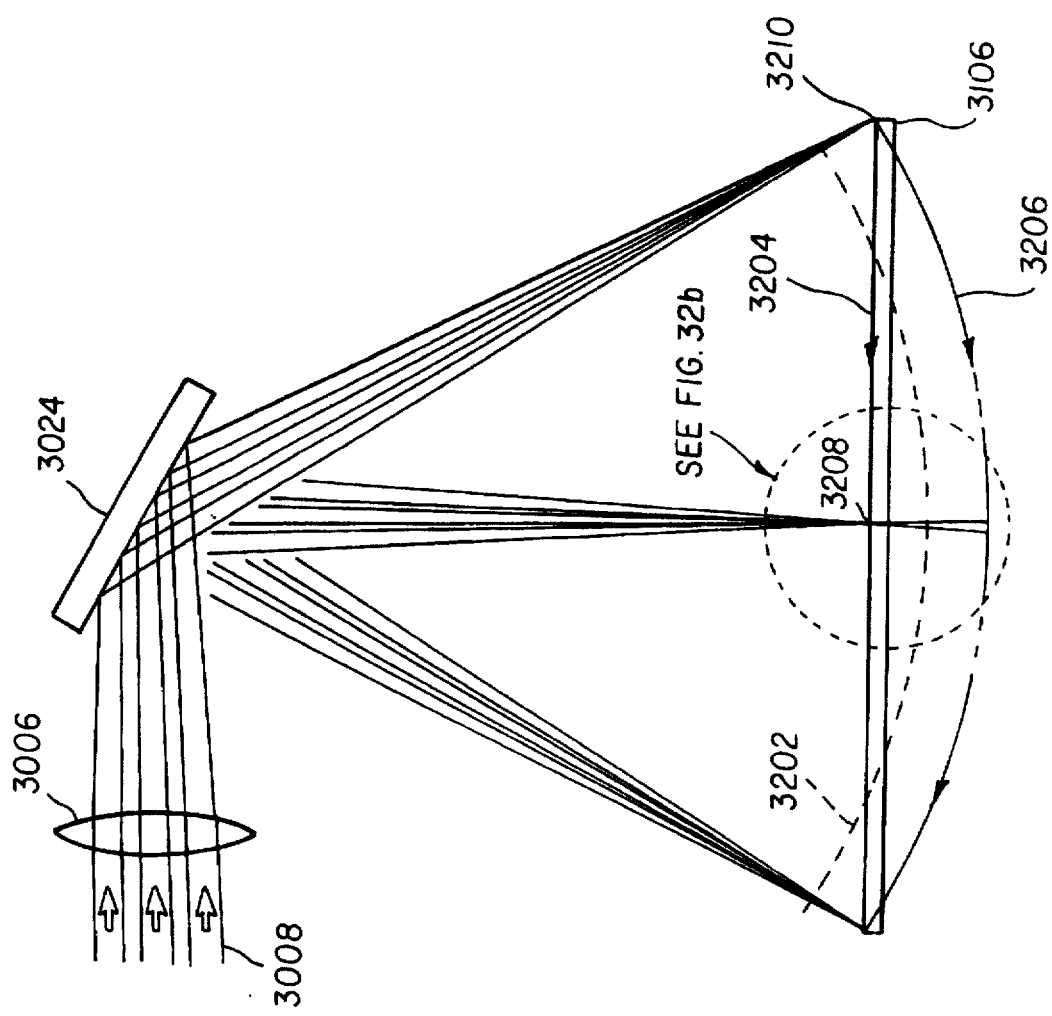

GANGED LASER SCANNING SYSTEM WHICH CORRECTS BEAM ALIGNMENT ALONG A BOW-TIE PATH

FIELD OF THE INVENTION

The invention relates to scanning systems comprising a beam that transversely scans a continuously moving media. The invention is particularly applicable to the field of computed radiography in which ganged lasers are used to create one or more scanning beams

BACKGROUND OF THE INVENTION

In standard medical x-rays a sheet of film is placed in contact with one or two phosphor sheets. The x-rays cause the phosphor to fluoresce, thereby exposing the film. With this method it is critical to insure appropriate exposure for the desired film density.

The x-rays also excite phosphors when using storage phosphor material. Part of the absorbed x-ray energy causes instantaneous fluorescence, but a significant part is stored in the phosphor and is not emitted as light until this type of media is discharged. The media is discharged by scanning a stimulating light beam across the phosphor. The stimulating light excites the phosphor causing the release of stored energy as emitted light The amount of emitted light emitted from each pixel area of the phosphor surface is measured and represents the quantity of x-ray exposure if the stimulating energy is constant. It is therefore critical to maintain uniform exposure when discharging storage phosphorous material. Non-uniformity may be caused by varying velocity in either the page-scan or line-scan direction, fluctuations in laser power, and vibrations affecting the linearity of the scanning beam path.

When scanning a storage phosphor, the scanning beam must have Sufficient power to convert the stored image to an emitted light image. Although gas lasers create a high energy beam, laser diodes have not been so powerful. Laser diodes have advantages of size, cost and direct modulability over gas lasers and are therefore desirable in laser scanning systems. It has been proposed to combine the beams from a plurality of laser diodes into a single beam to increase the beam power. (See: U.S. Pat. No. 4,689,482, issued Aug. 25, 1987, inventors Horikawa et al.; U.S. Pat. No. 4,681,394, issued Jul. 21, 1987, inventor Noguchi; U.S. Pat. No. 4,924,321, issued May 8, 1990, inventors Miyagawa, et al.). In ganged laser systems, problems arise in achieving synchronized media tracking, automatic alignment, variable spot size control, and effective depth of focus control.

SUMMARY OF INVENTION

According to the present invention there is provided a solution to the problems noted above. The present invention provides a ganged laser system having dynamic laser aiming to achieve synchronized media tracking, automatic alignment, variable spot size control and effective depth of focus for a group of lasers.

A feature of the present invention relates to apparatus for combining several laser systems, forming a ganged laser assembly and measuring and correcting beam misalignments and page scan or line scan positioning errors. One embodiment combines two oppositely polarized laser beams through the use of a polarized mirror that reflects one polarized beam while passing the other, thereby allowing the beams emitting from each laser system to be combined forming a coaxial beam. In a related embodiment at least one of the laser systems is equipped with a horizontal positioner, which affects movement of the lens in a horizontal manner, and a mirror that is used to direct the coaxial beam to a linear array; information derived from the linear array is input to a controller that calculates a correction factor, this correction factor being used to adjust the horizontal positioner.

Another feature of the present invention provides apparatus for combining two or more ganged laser assemblies, measuring and correcting beam misalignments and positioning errors, and reducing spot size variations. The coaxial beam of at least two ganged laser assemblies are directed by a knife edge mirror, forming beams in close parallel alignment. These beams travel through a beam focusing lens where they are focused to a common spot, and then continue in a linear fashion to a second mirror, this mirror directing the combined beams through an f-theta lens, which directs the combined beams to a scanning stage. In a related embodiment a second knife edge mirror deflects the combined beams to a detector, data is transmitted from this detector, and the beams are focused accordingly. In another embodiment, at least one sensor is attached to the lead edge of the scanning stage, where it is mounted to be coplanar with the phosphor plate surface, data is transmitted from this detector to a controller, the controller transmits feedback data, and the beams are focused accordingly. In a further embodiment, beams are differentiated by attenuating a varying percentage of each beam and determining beam/spot correlation based on spot intensity.

One disclosed embodiment of the present invention relates to a method of widening the scanning spot for low resolution scanning by using ganged laser assemblies and shifting the laser beams to be mispositioned in the page scan direction, resulting in two spots or more positioned side by side, and increasing the time increment during which data is collected for each pixel.

BRIEF DESCRIPTION OF THE DRAWINGS

FIG. 31 is an explanatory diagram showing beams focused and coincident to minimize spot size at the edge of the media.

FIG. 32 is an explanatory diagram showing the preferred path of best focus and coincidence.

DETAILED DESCRIPTION OF THE DRAWINGS AND THE INVENTION

Figure 1:
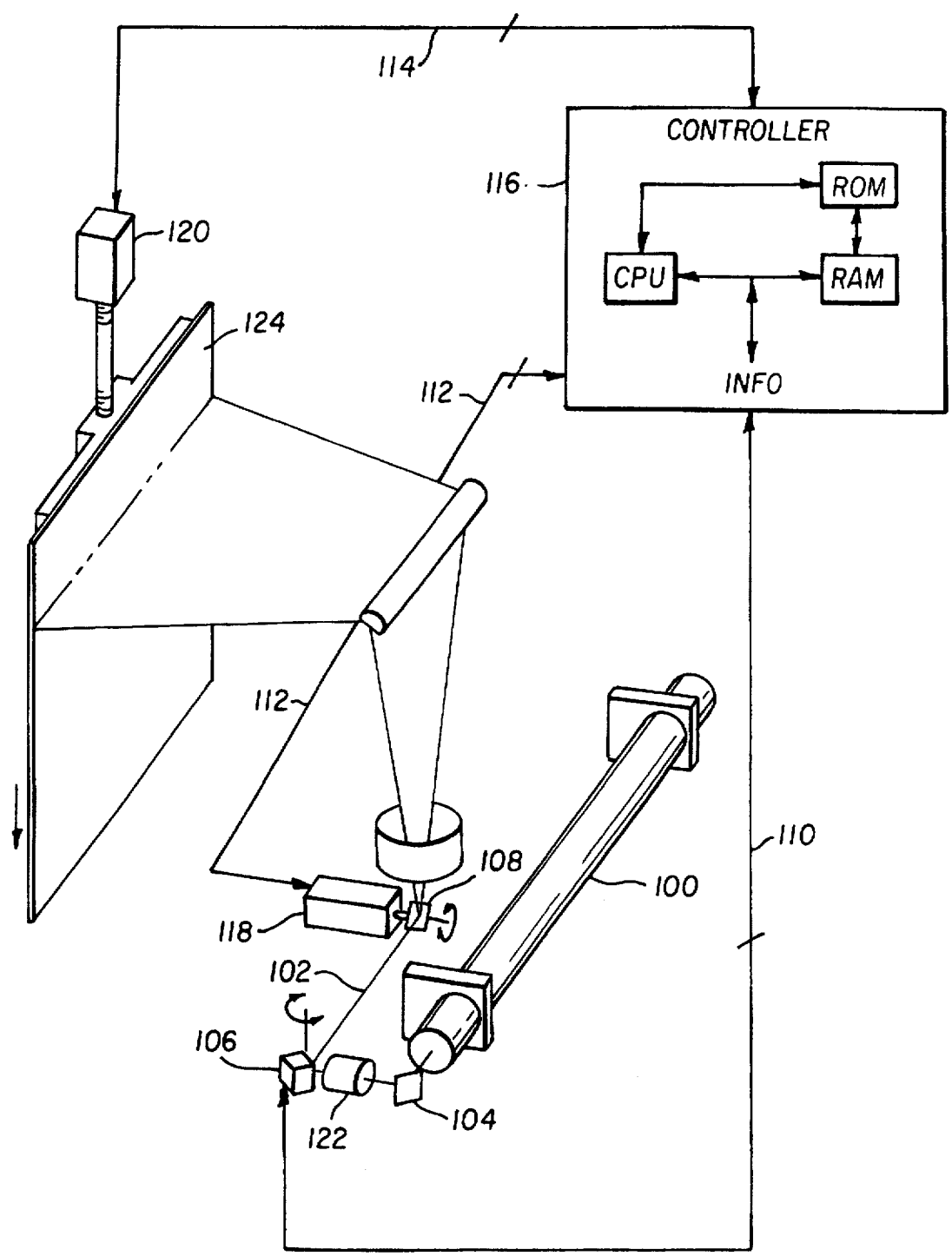
FIG. 1 is a schematic view of a laser system.

FIG. 1 is a schematic view of a laser system. The laser system includes laser 100, which emits beam 102. Beam 102 is directed by stationary mirror 104, focused by lens 122 and directed by a first moveable mirror such as piezo-electric mirror 106 and a second, bidirectional, moveable mirror such as galvanometer mirror 108. Piezo-electric mirror 106 tracks media 124 motion in the page-scan direction while galvanometer mirror 108 scans beam 102 across media 124 in the line-scan direction. When beam 102 reaches the end of a line-scan, piezo-electric mirror 106 returns one line pitch while galvanometer mirror 108 reverses direction of beam 102.

In the laser system depicted in FIG. 1, first control bus 110 connects controller 116 to first moveable mirror 106; second control bus 112 connects controller 116 to galvanometer 118; and third control bus 114 connects controller 116 to media driver 120. An example of media driver 120 is a motor coupled to a lead screw that translates the carrier stage for moving media 124 at selected speed. Data is transmitted via buses 110, 112, and 114 to controller 116 where it is processed. Control signals transmitted via buses 110, 112, 114, control the position of first moveable mirror 106, second moveable mirror 108 and control the operation of media driver 120, respectively.

Figure 2:
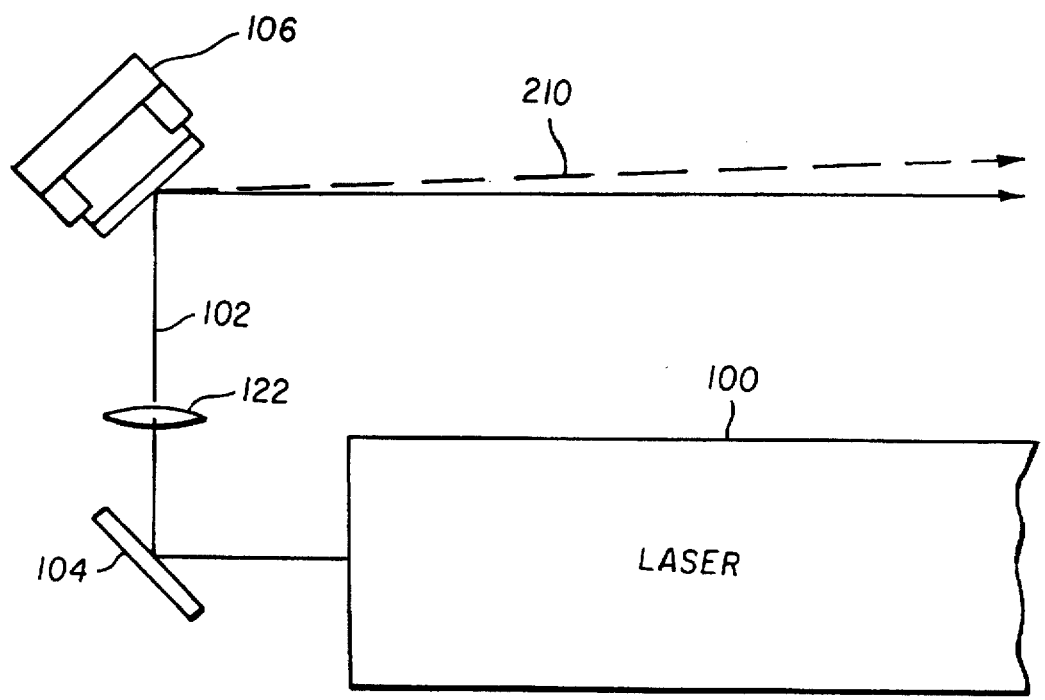
FIG. 2 is a schematic view of a portion of a laser system.

As shown in FIG. 2, laser 100 emits beam 102 along a path toward stationary mirror 104 through focusing lens 122 to a first moveable mirror such as piezo-electric mirror 106. Beam 102 is deflected by piezo-electric mirror 106 to a position shown by a vertical (media direction) deflection 210.

Figure 3A:
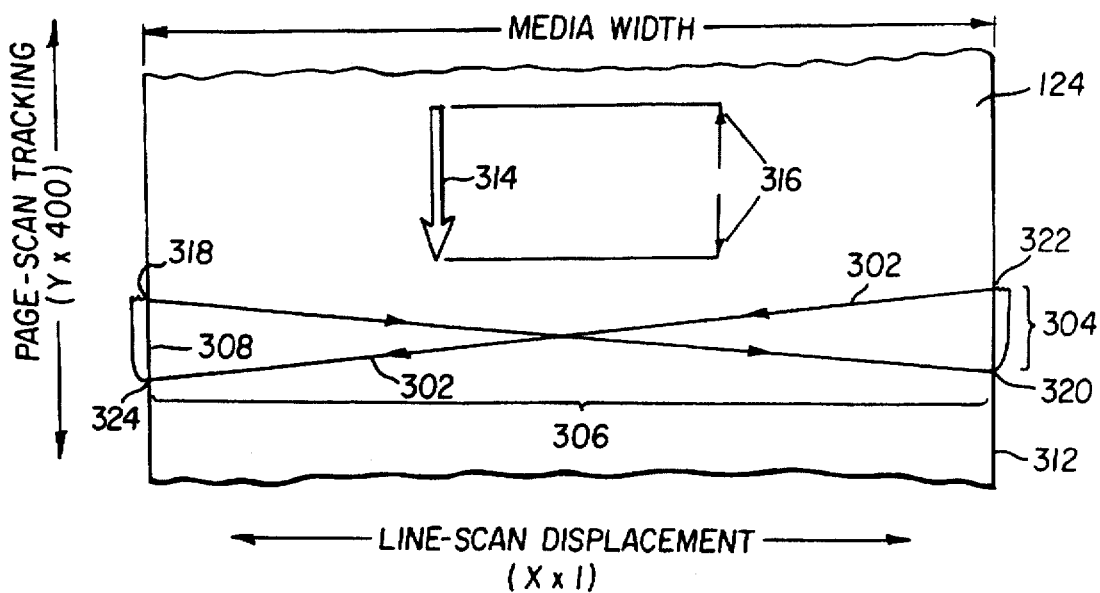
FIG. 3a is an explanatory diagram of a bow-tie laser trace as seen by a stationary observer.

A resulting "bow-tie" pattern 302 is shown in FIG. 3a. Beam 102 is moved by piezo-electric mirror 106 and galvanometer mirror 108. Height 304 of bow-tie 302 is one line pitch and width 306 is the length of the line-scan. If for instance the pixel pitch is 100 microns in X and Y and a scan line contains 2,000 pixels, the "bow-tie" is 100 microns high and 200,000 microns wide. With this type of scanning system and method described hereinafter, it is possible to achieve a 95% or better duty cycle, where the duty cycle is defined as data transfer time divided by total scan time.

As represented in FIG. 3a, the beam scans a path beginning at first location 318 on first edge 308 of media 310, moving across media 310 to second location 320, on opposing edge 312 of media 310, in a direction traversing media travel 314. The beam continues moving parallel to second opposing edge 312 in a direction opposite that of media travel 314 for a distance equal to one-half of media travel during one full bow-tie cycle 316, to third location 322. The beam continues moving across media 310 traverse to the direction of media travel 314 to fourth location 324. The beam continues moving along first edge 308 of media 310 for a distance equal to one-half of media travel during one full bow-tie cycle 316, thereby returning to the beginning point of the bow-tie pattern, first location 318. This pattern is repeated throughout the duration of the scan.

Figure 3B:
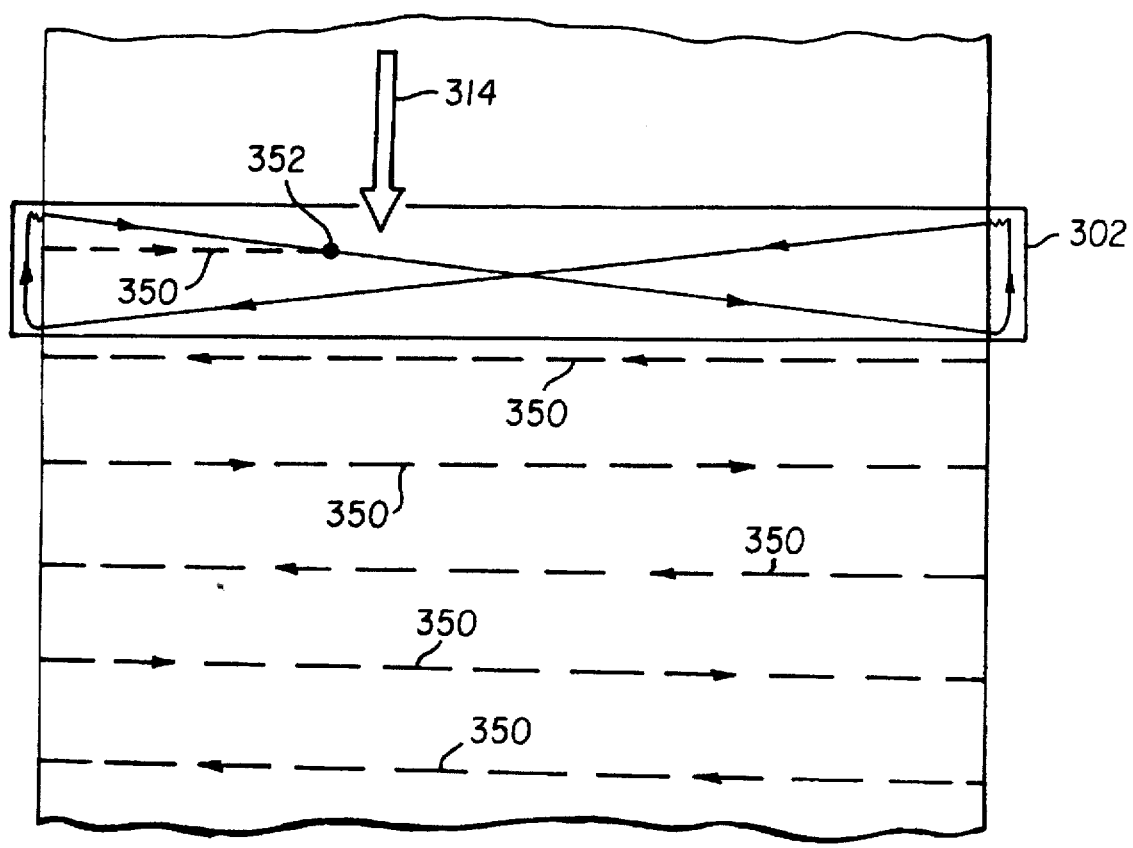
FIG. 3b is an explanatory diagram of an image resulting from a bow-tie laser pattern.

Turning to FIG. 3b, there is shown an explanatory diagram showing scan trace pattern 350 created on the media by a beam spot 352 following bow-tie pattern 302 with constant media travel 314. As depicted, resulting image 350 comprises a series of parallel lines.

Figure 4:
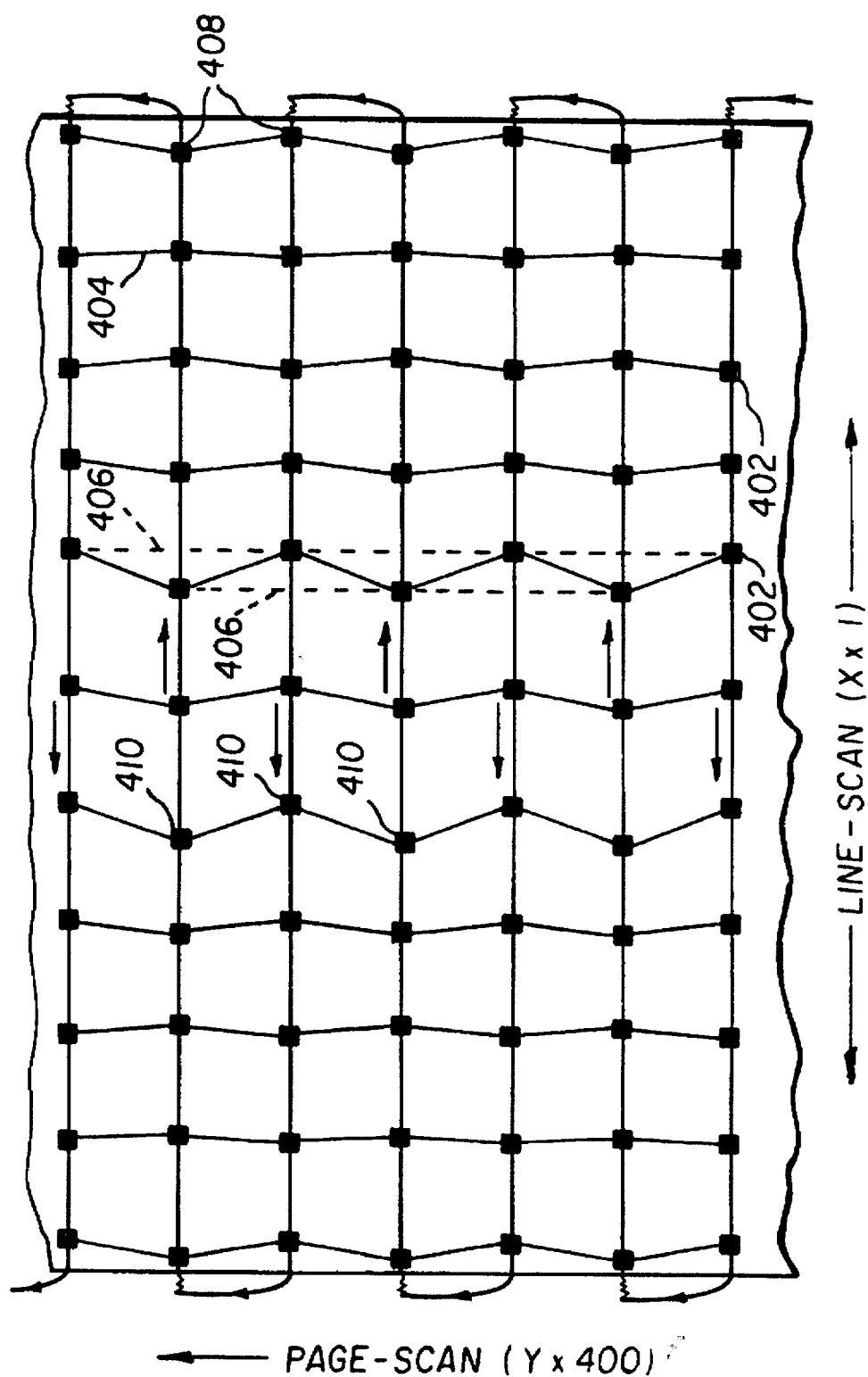
FIG. 4 is an explanatory diagram showing a bidirectional scan with constant media and page-scan tracking velocities, repeatable galvanometer velocity variation, and pixels clocked at equal time increments.

A bow-tie scan requires very accurate positioning of the spot of beam 102 since positioning errors will not be hidden as they are in the conventional sawtooth scan. FIG. 4 shows a bidirectional scan for which media velocity and page-scan tracking mirror velocity are constant, pixels are clocked at equal time increments and the galvanometer velocity varies significantly within each line but repeatably from line to line. Significant horizontal pixel offset position errors 410 are evident in adjacent lines 402. Such horizontal offset, when small, will appear as blurring of narrow vertical features 404 and, when large, will show double images of fine vertical features 406. Additionally, due to this velocity variation, lines 408 traced across the media are not perfectly straight. Considering that the vertical positioning error in FIG. 4 is shown at 400x, this vertical error is minor compared to the horizontal error shown at 1x. In a scanner of this type, one of the biggest source of "X" position error results from not knowing when to set line start for left-to-right scans vs. right-to-left scans.

Figure 5:
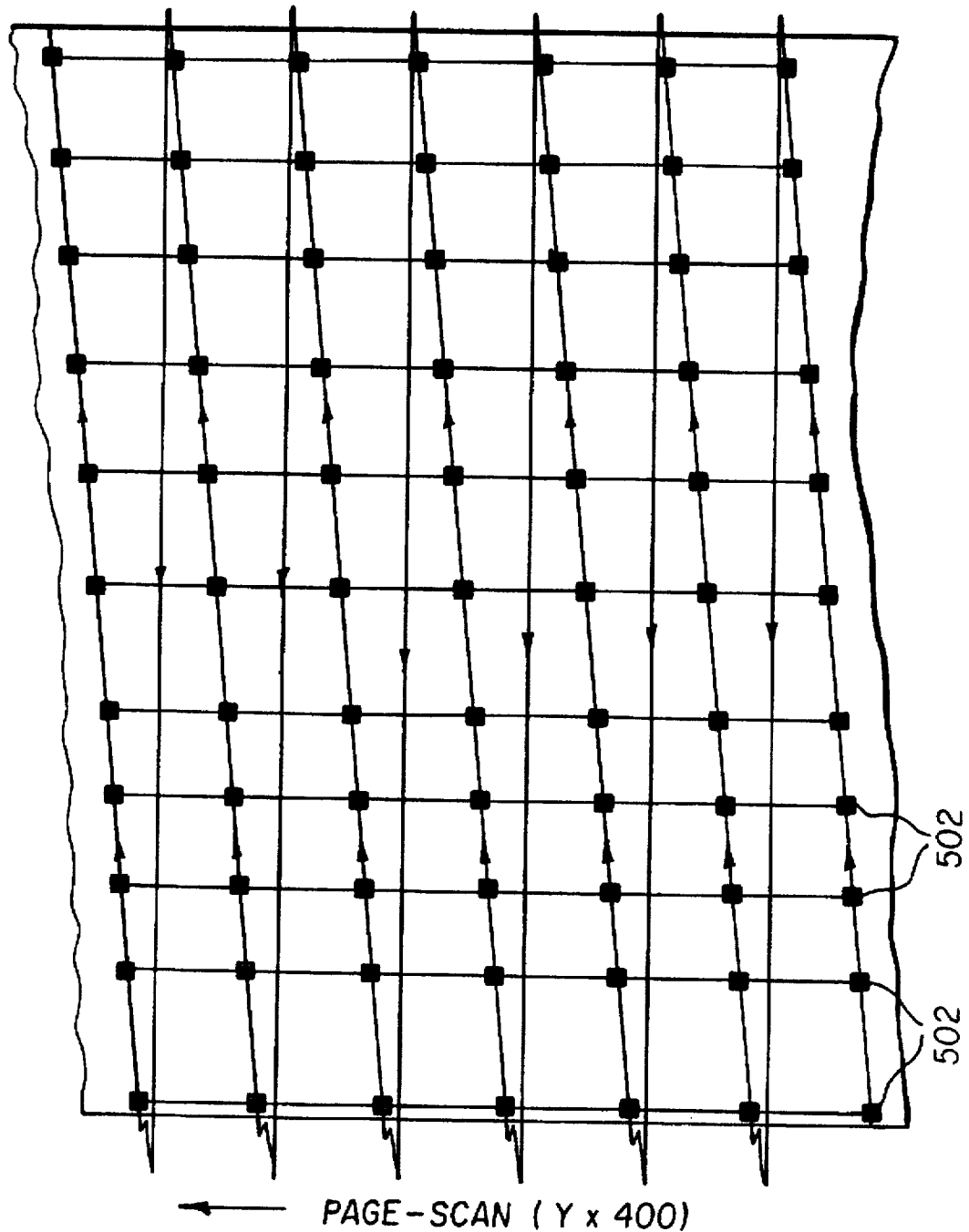
FIG. 5 is an explanatory diagram showing the same repetitive position errors in a conventional sawtooth scan.

In FIG. 5 the same repetitive position errors 502 line up in a standard sawtooth scan, making them much harder to detect. Even if the vertical positioning errors were much greater, they would line up and nest in a sawtooth scan as long as they are consistent and repeatable. Shifting line start in a sawtooth scan simply shifts the whole image relative to line start rather than offsetting succeeding lines of data relative to one another.

Figure 6:
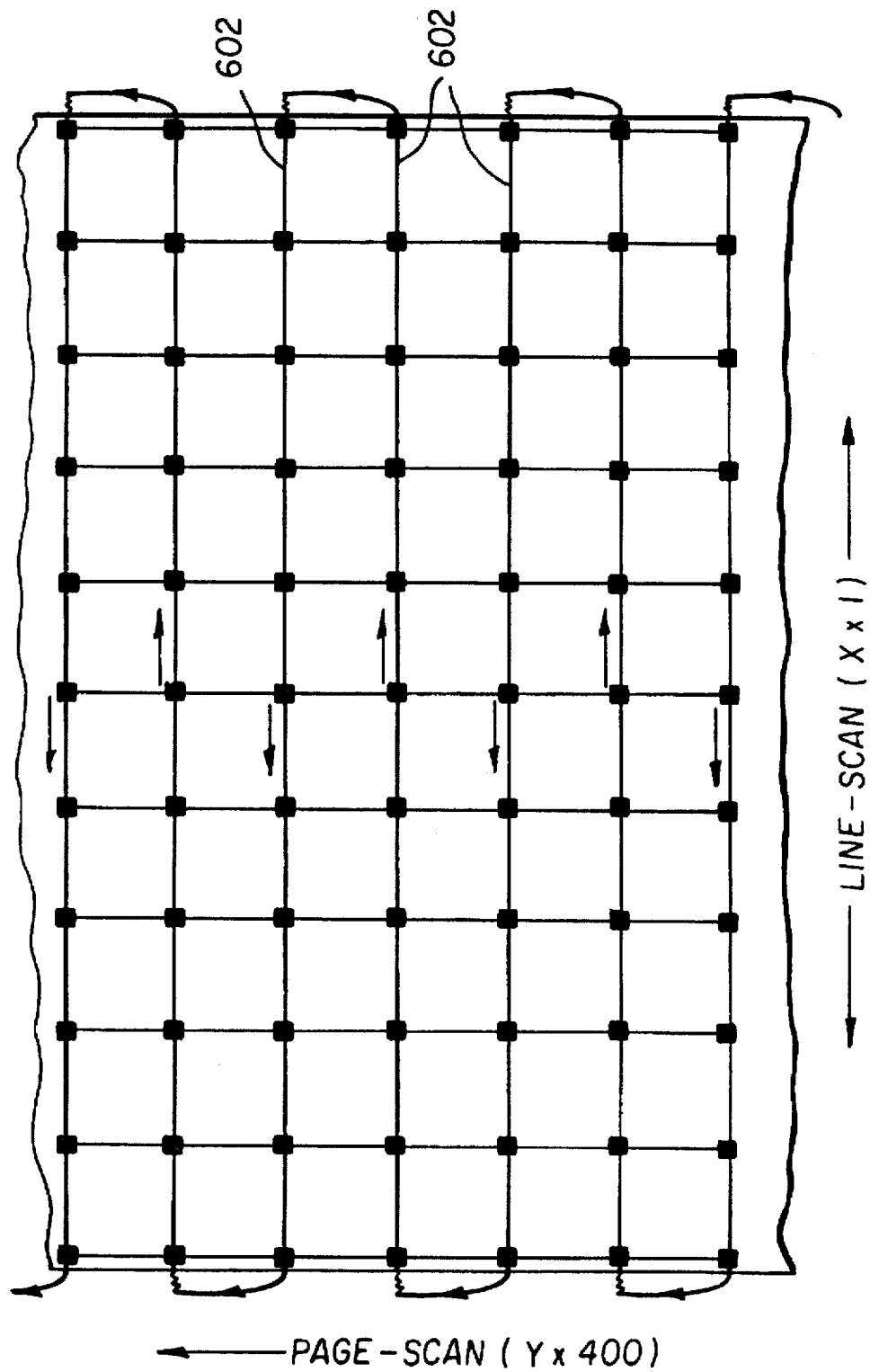
FIG. 6 is an explanatory diagram showing a bidirectional scan with constant media and page-scan tracking velocities, repeatable galvanometer velocity variation, and pixels clocked at equal position (x) increments.

FIG. 6 shows the same scan conditions as shown in FIG. 4 except that the pixels are clocked at equal displacement increments in the X direction. In one embodiment this is accomplished by reflecting a small part of the beam to scan a grating to obtain a position signal to clock data reads. This is done by using a beam splitter down stream of the galvo to redirect a small percentage of the scanning beam as a reference beam to a grating placed in front of a light collecting device. By using the reference beam intensity signal drops, caused by the grating's equally spaced marks, as clocking signals, equally spaced data reads can be obtained. This approach solves most of the "X" position errors described for FIG. 4.

Velocity variations, however, are still present in this scan with resulting minor vertical pixel positioning errors resulting in scan lines 602 that are not straight. In the case of computed radiography, signal strength variations can result from both velocity variations of the beam and space variation between scan lines. Factors other than galvanometer velocity variations also cause vertical positioning errors in the spot trace. These factors include: forces from the galvanometer coils causing the shaft to bend as it pivots, the bearings having some play or noise in them, or the dynamic forces on the shaft and/or mirror causing distortions.

Figure 7:
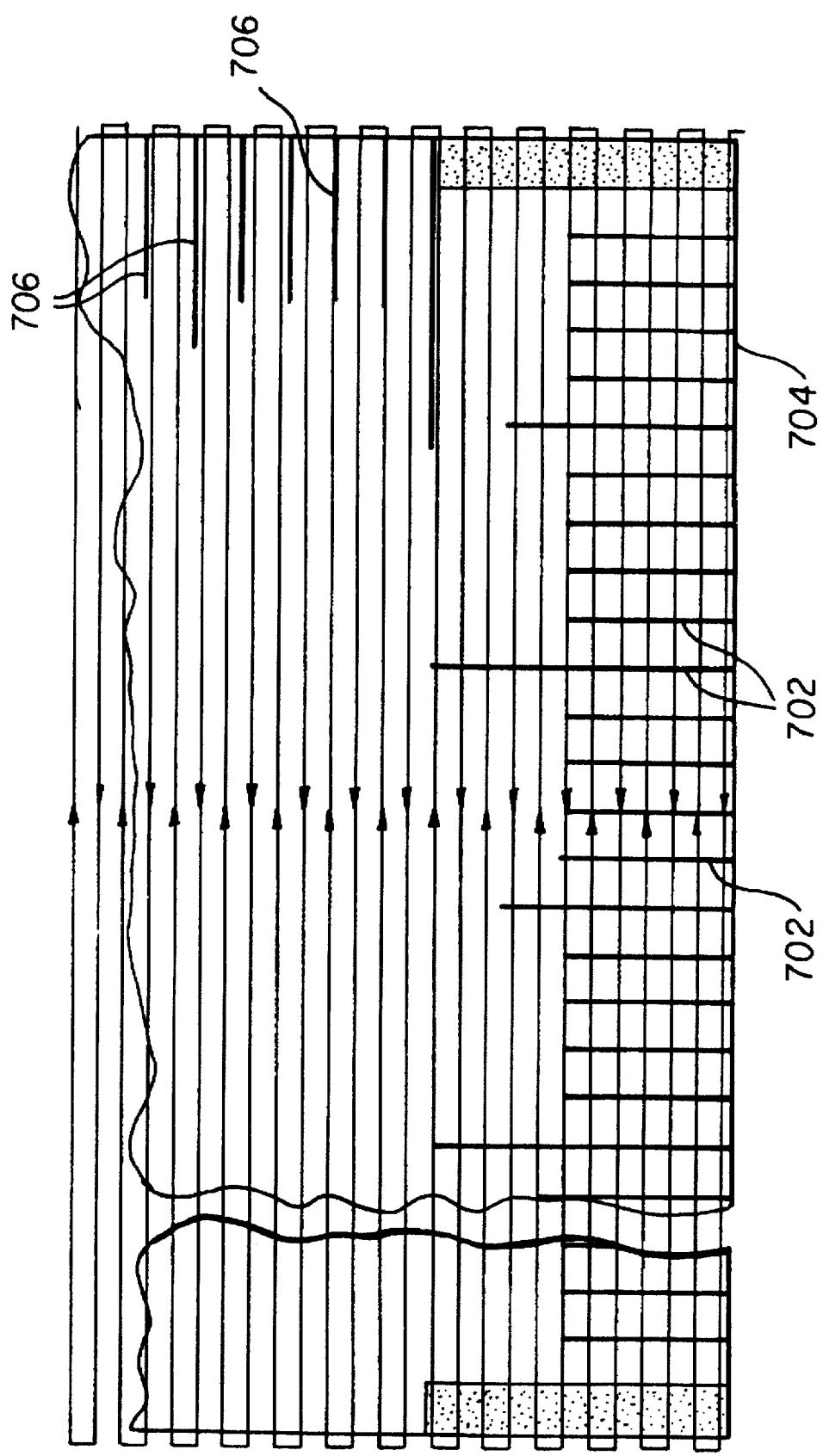
FIG. 7 is a schematic view of a calibration grating.
Figure 8:
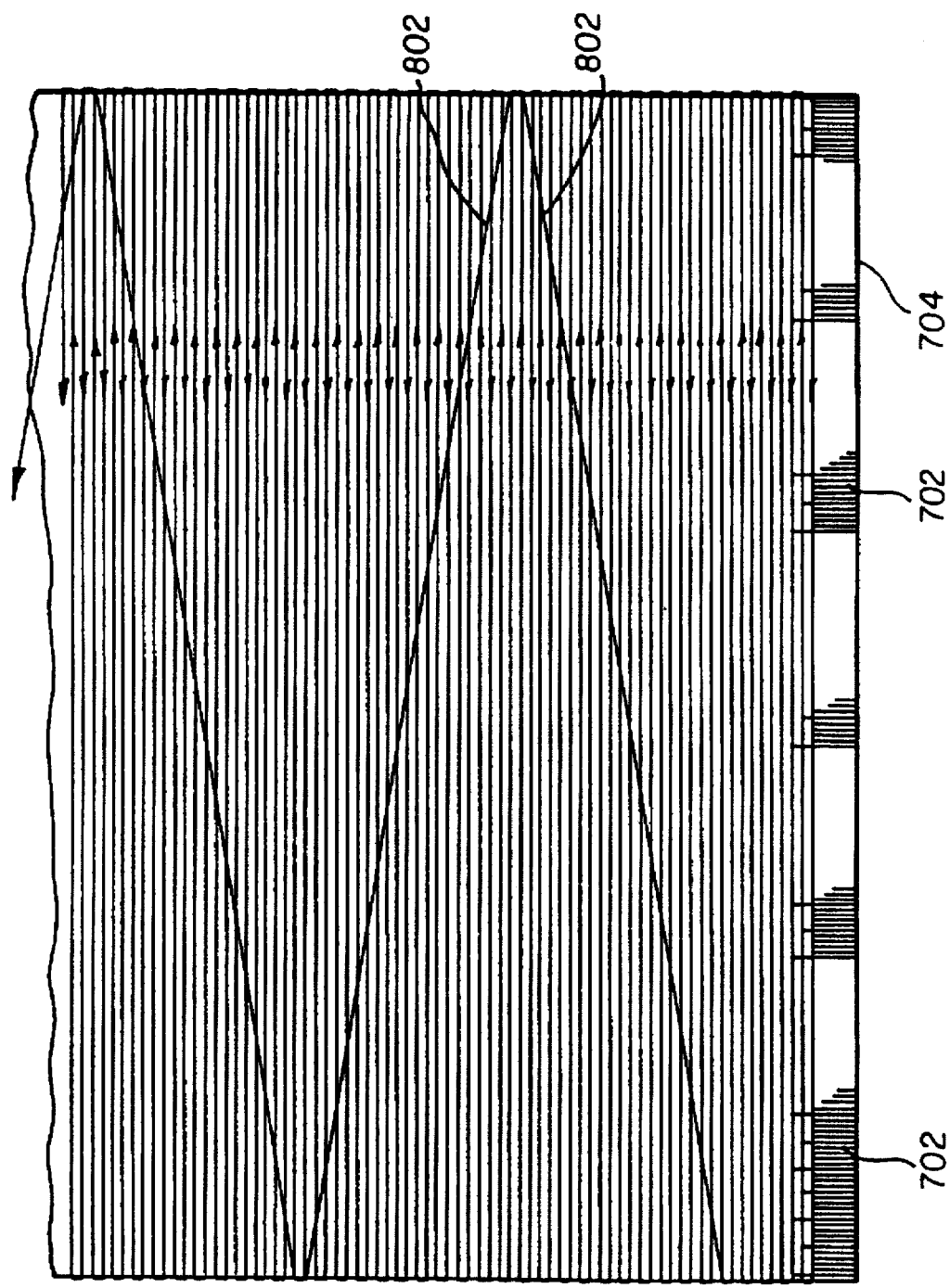
FIG. 8 is a schematic view of a recording media with calibration grating and energy troughs.

A way to correct for either or both galvanometer velocity variations and data collection clocking errors is shown in FIGS. 7 and 8. A calibration grating 702 is provided at the lead edge of storage phosphor sheet 704 (or a calibration sheet of film for a film digitizer). Line start for both left-to-right and right-to-left scans can be set relative to calibration grating 702 at the lead edge of the sheet. Once the line starts and line ends of sequential lines have been aligned, the data can be examined to see if the grating line data from left to right and right to left is aligned all the way across the scan. Misalignments would indicate local velocity fluctuations in the galvanometer scan speed and the collected data would provide the necessary information to generate a lookup table to correct these errors. The fluctuations are often different depending on the direction of the scan, i.e., they are different for right and left scans. This is solved by generating different correction data for the respective lookup tables. The correction data can be used to generate an altered pixel clocking which achieves equal pixel spacing in spite of the varying spot velocity. Preferably, the data is used to alter the galvo velocity profile to achieve a constant spot velocity on the phosphor so that pixel clocking at equal time increments yields equal pixel spacing.

In a preferred embodiment, the grating represents common units such as millimeters and can also serve as a scale verification for the radiologist. The grating for instance would show one millimeter tick marks with longer marks every centimeter. FIG. 7 shows a similar grating printed along the side edge of screen 706 providing scale verification on that axis for the radiologist. (Note that in FIG. 7, scan lines are shown at 400x spacing in the page scan direction for illustration purposes, while the scale on the media side edge is at 1x.)

It is possible to update or confirm the lookup table at the start of every scan with phosphor media which has this grating. That way, in cases where the galvanometer performance slowly changes with time, it would be compensated by the updated correction. With the exposure levels obtained in most radiographs this should be possible to do in a sufficiently large percentage of the exposures. In cases where the exposure is too low in some areas to read all the tick marks in the grating the last look up table values would be used without updating. For applications where the system cannot reliably detect the tick marks amongst the varying density patterns of a standard radiograph, the lookup table is generated with a calibration flat field exposure. This could be done in the same calibration run that uses a flat field exposure to generate the collector profile correction table.

Figure 9:
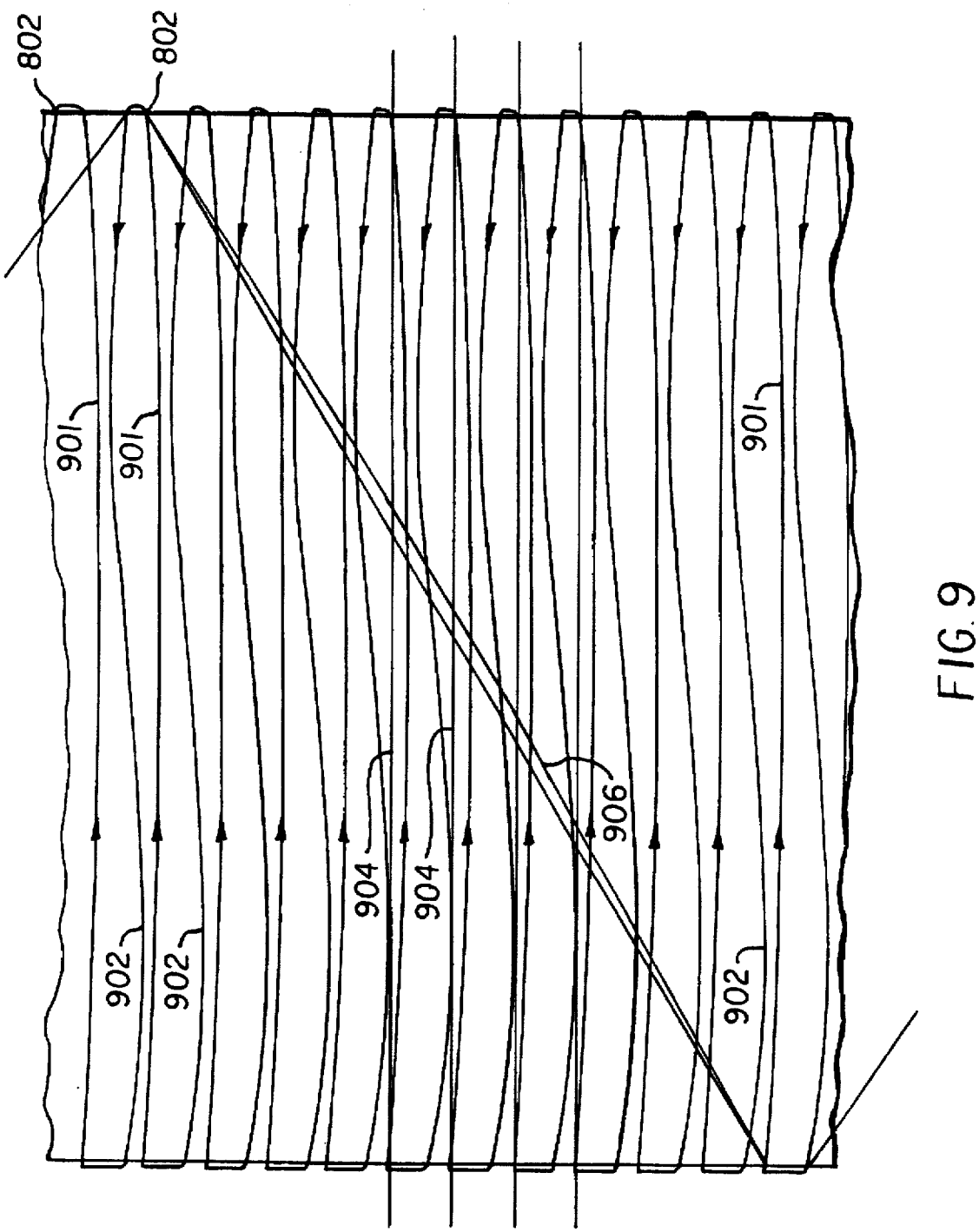
FIG. 9 is an example of displacement of alternate scan lines in the page-scan direction.

As stated, displacements of alternate scan lines in the page-scan direction may occur. A hypothetical scan pattern showing displacements of this type is shown in FIG. 9. Here, first scan trace 901 has a sagging bow, while second scan trace 902 has a sinusoidal bow. Trace 904 shows the route of a straight line. A first moveable mirror such as piezo-electric mirror 106, (see FIG. 2) will correct this type of error. In one embodiment this is done through the calculation and implementation of the necessary correction factors to provide an equal and opposite page-scan displacement to beam 102 from that introduced by the second, bidirectional, moveable mirror such as galvanometer mirror 108. In a preferred embodiment the generation of a table of correction factors is achieved through the same calibration run that provides the line-scan velocity and position correction and the collector profile uniformity correction.

To generate the page-scan error correction table the galvanometer velocity and line start corrections must first be made using calibration grating 702 as previously discussed and applied to the galvanometer driving profile. To then generate a piezo-electric correction table needed to correct line bow differences as shown in FIG. 4, a diagonal line must be available for the scanner to digitize. With a computed radiography scanner a diagonal line of sufficient quality can be generated by the scanner itself by increasing the page-scan transport velocity to 20X or 30X normal speed while scanning the flat field exposure. In a preferred embodiment this period of travel is at least equal to the time required to complete one line scan, which at the increased constant page scan velocity generates a diagonal trace. Several line scan cycles are preferred. This results in the laser draining zigzag energy troughs 802 in the flat field exposure as shown in FIGS. 8 and 9. The transport is then reversed and the zigzag "grating" generated at the high speed is then scanned at normal transport speed. The crossing of scan lines across the energy troughs generates the necessary data matrix to calculate the page-scan correction table for a first moveable mirror such as a piezo-electric mirror. In one embodiment using a film scanner or a computed radiography scanner, a calibration film or phosphor with the necessary lead edge Grating and diagonal straight lines printed on its surface is used.

FIGS. 9 through 14 exemplify the process for Generating piezo-electric correction data where the computed radiography scanner Generates the diagonal line. In FIG. 9, diagonals 906 generated by the scanner have the same distortions (in this example a sag for left-to-right lines) as the scan lines 901 Generated at the standard page-scan speed. The steps shown in FIGS. 10 through 14, generate the correction factors to be applied to the right-to-left piezo-electric driving signal ramp to make the right-to-left scan parallel and equidistant to the left-to-right scan lines.

Figure 10:
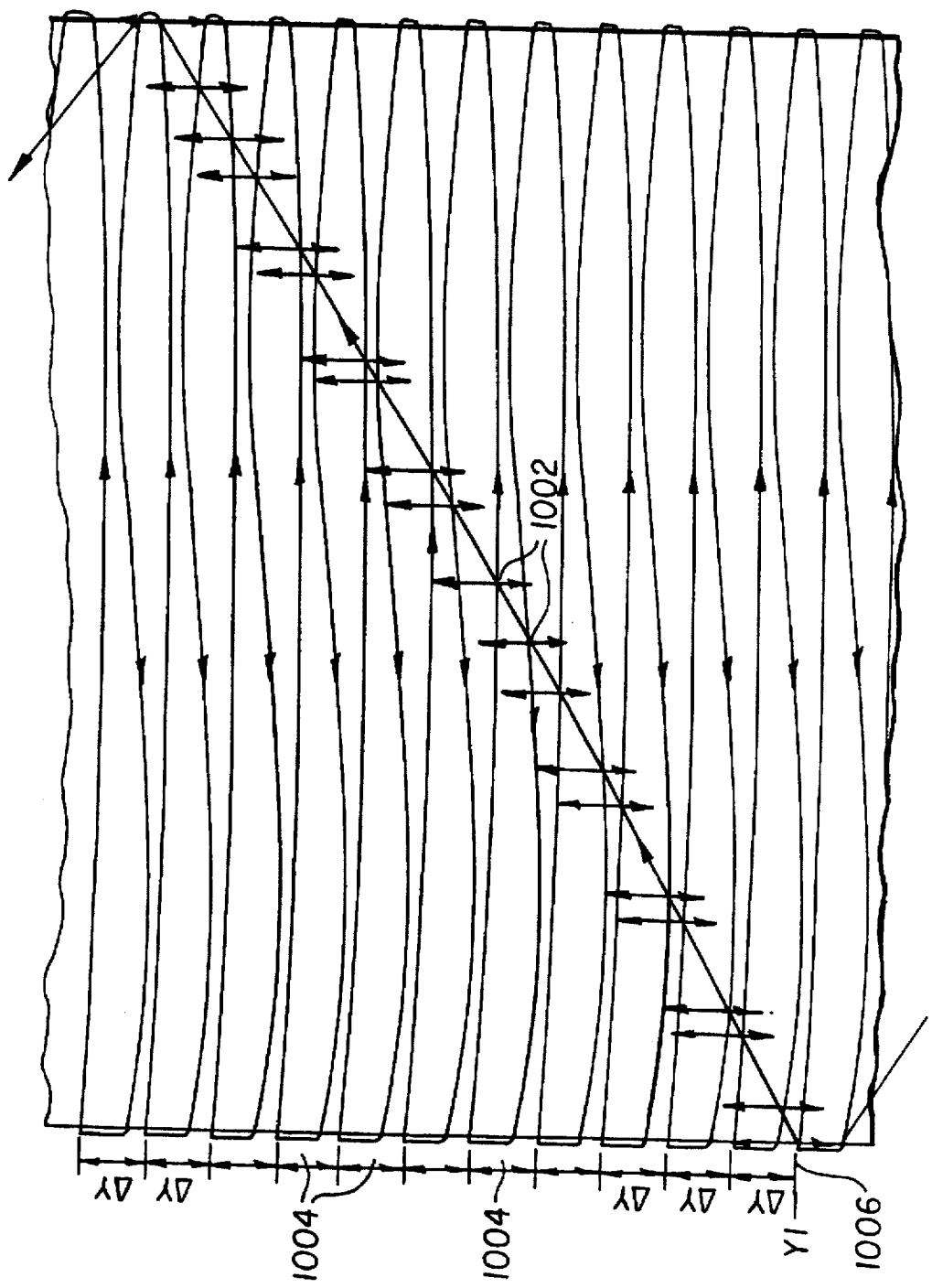
FIGS. 10–14 are explanatory diagrams showing steps to generating correction factors.

FIG. 10 exemplifies knowledge obtained after scanning the 20x trace: The x position of the intersection of 1x and 20x scans is known, but their y position 1002 is uncertain since we don't know the shape of the 20x line; Δy increment 1004 that the phosphor travels during a galvanometer cycle is known, and knowledge pertaining to $Y_1$ 1006 depends upon how well the y (page scan) drive motor position is controlled relative to galvanometer cycling.

Figure 11:
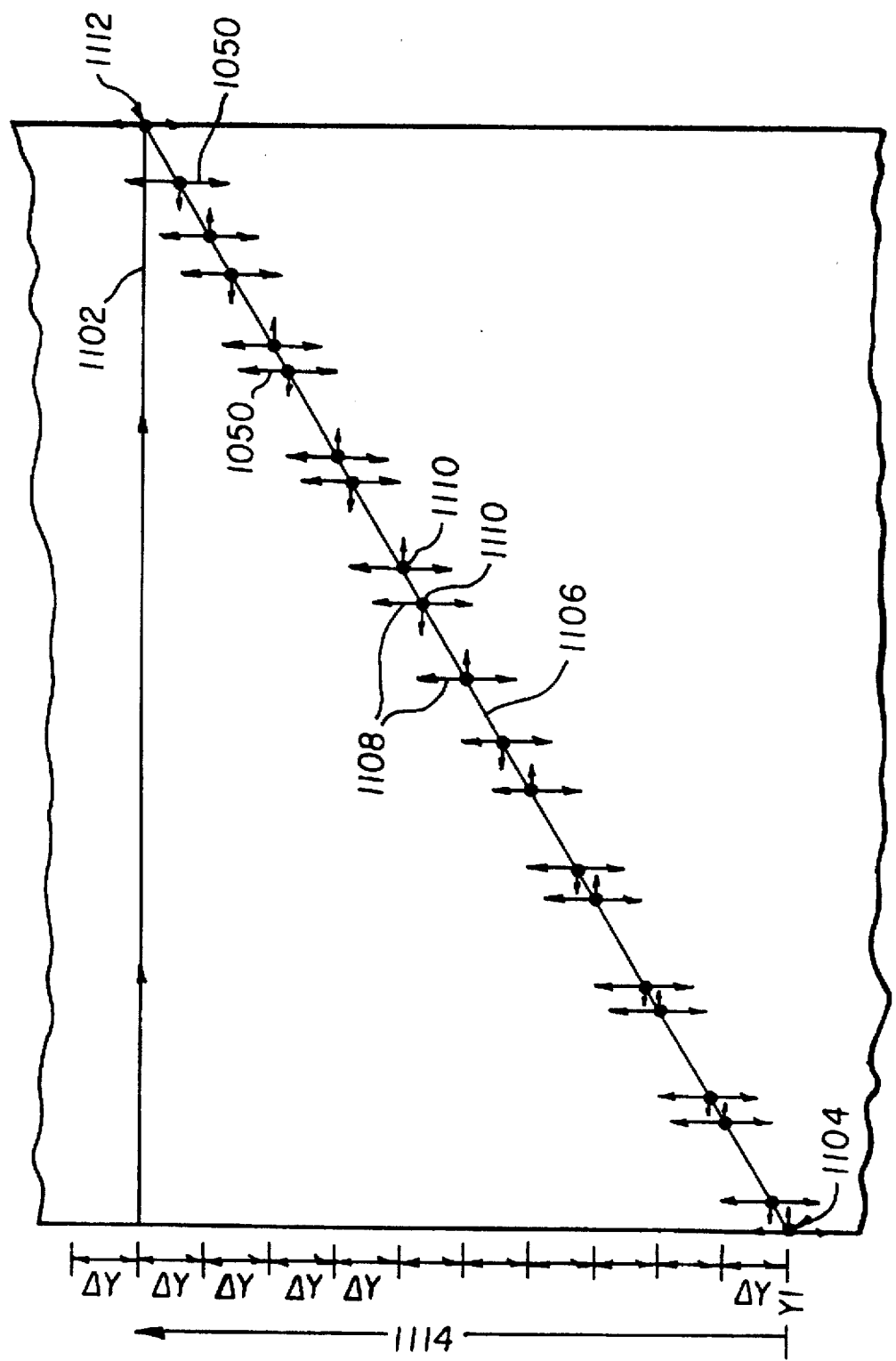

FIG. 11 graphs data points assuming a straight left-to-right trace 1102, a straight 20x scan trace 1106 and a $Y_1$ position 1104. A point is plotted twenty scan lines or 10 times Δy 1114 up from position 1104. Plotting straight line 1102 across from this point yields point 1112 (the end point of left-to-right 20x trace 1112). The straight line 1106 can now be drawn. The vertical lines 1108 indicate the known x positions of the crossing points of the normal speed scan lines with the 20x page scan speed left to right scan line. Points 1110 represent the location of the crossing points based on the straight 20x left to right scan line assumption.

Figure 12:
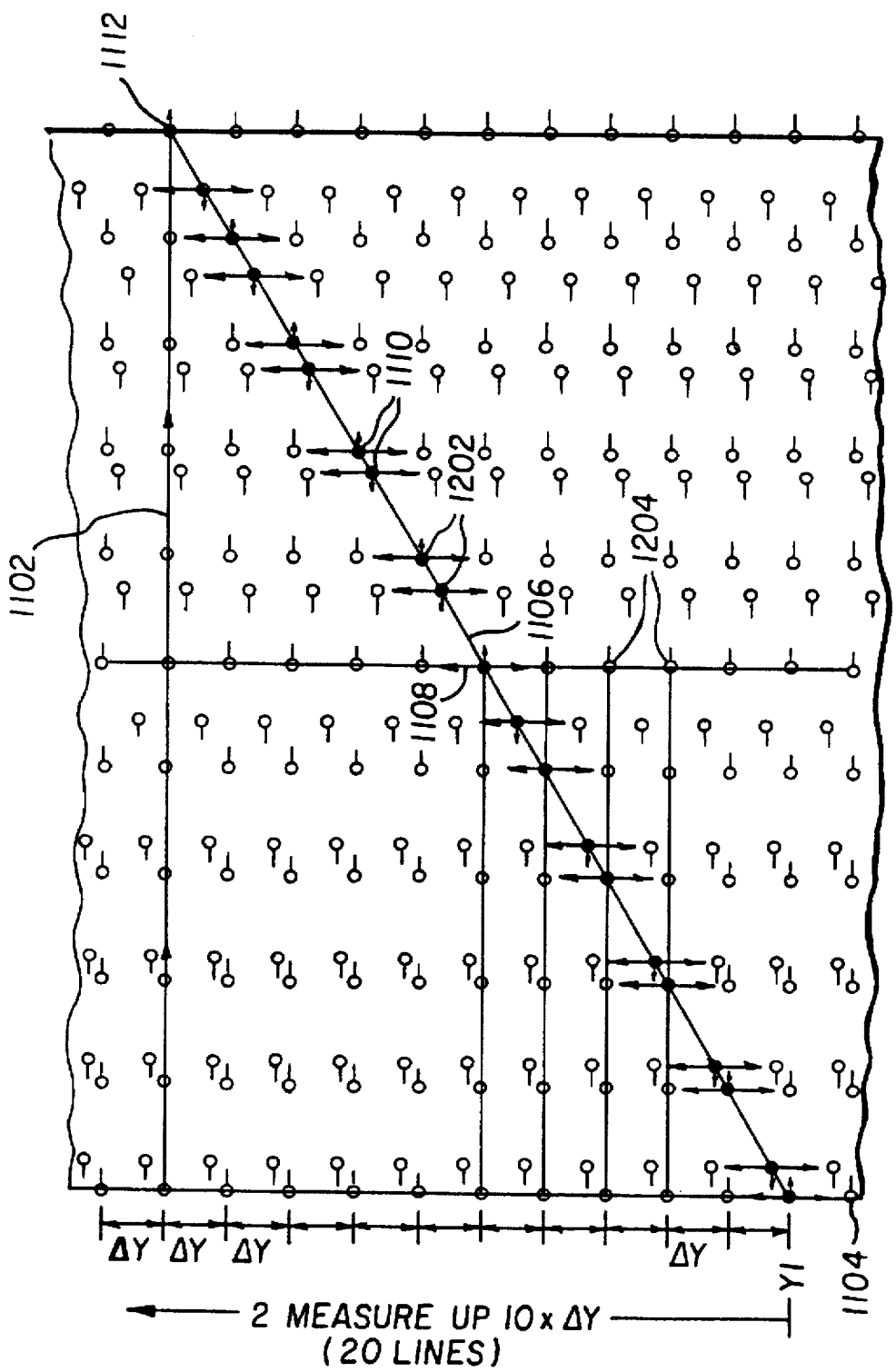

FIG. 12 exemplifies the inclusion of copies at Δy increment of the data points calculated in FIG. 11. This is true if the scan profile does not change from cycle to cycle. By copying, data points from scan data 1202 at delta y increment to yield copies 1204, the necessary points are generated to reconstruct the scan line shapes.

Figure 13:
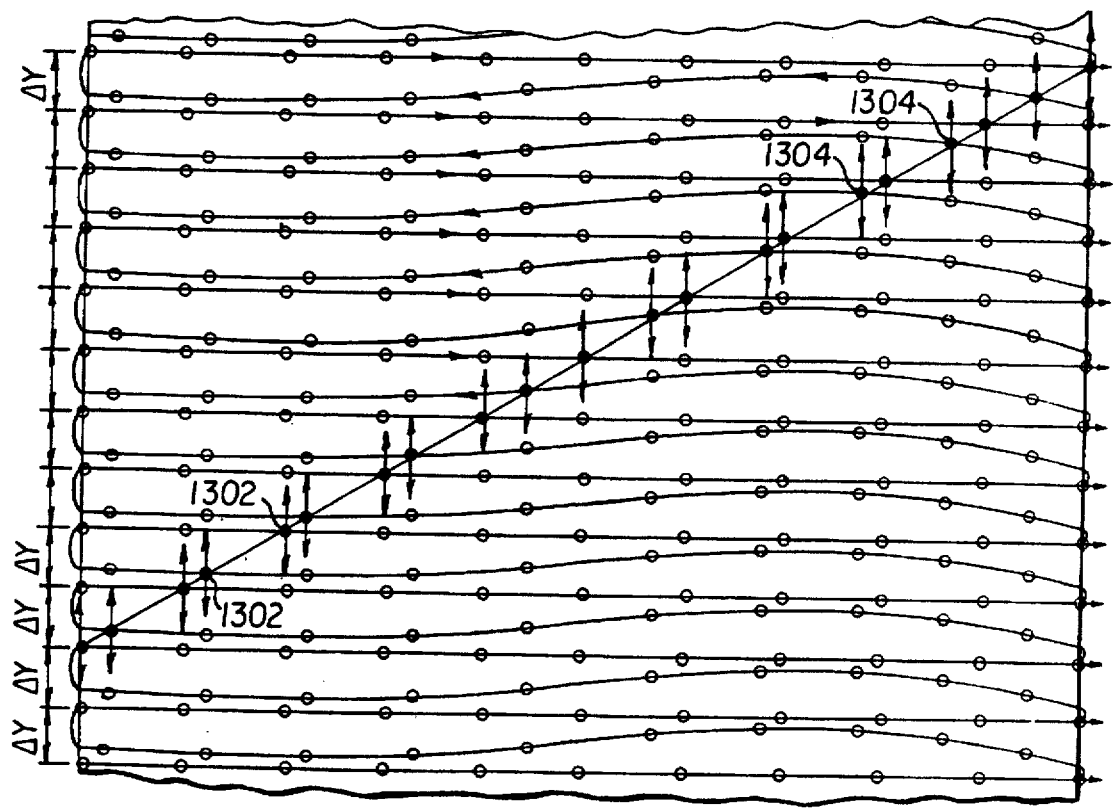

As exemplified by FIG. 13, curves are fitted through the data points plotted in FIG. 12 to represent right-to-left 1302 and left-to-right 1304 scan lines which correspond to 901 and 902 scan lines in FIG. 9 with the 901 line assumed straight.

Figure 14:
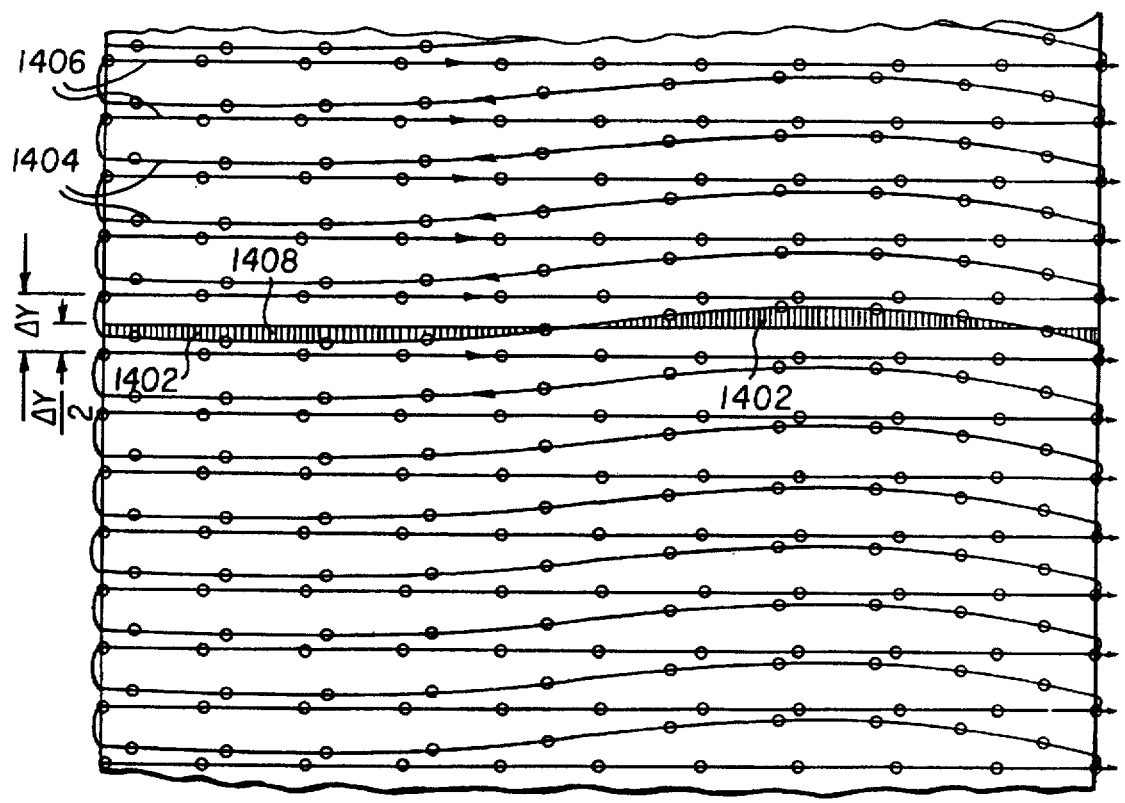
Figure 15:
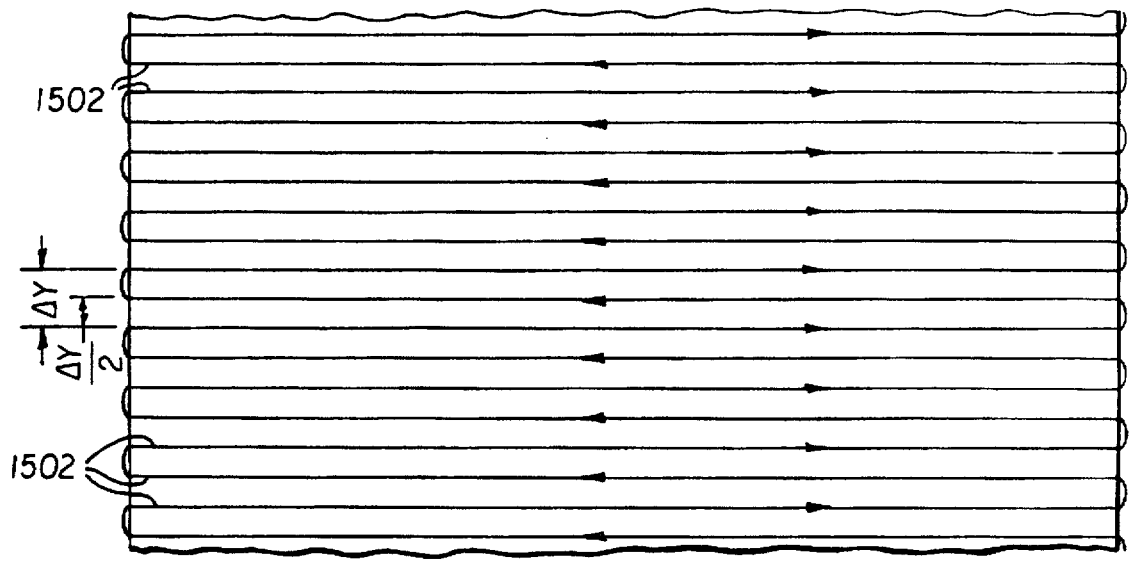
FIG. 15 is an explanatory diagram showing the corrected scan if left-to-right line-scan had been truly horizontal.
Figure 16:
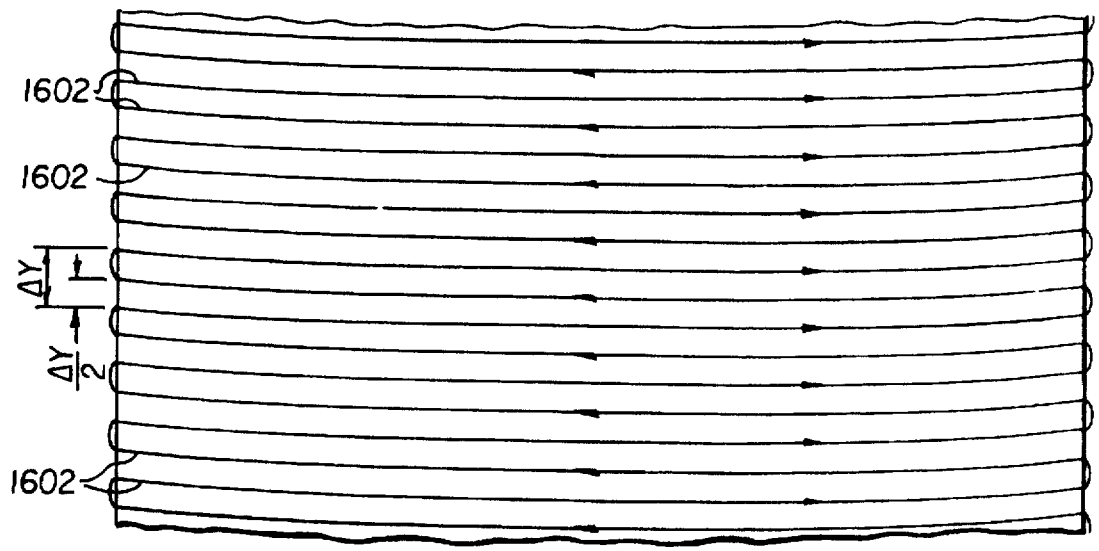
FIG. 16 is an explanatory diagram showing the corrected scan of the example.

FIG. 14 exemplifies correction factor 1402 used to straighten right-to-left scan lines 1404 making them equidistant to left-to-right scan lines 1406. As exemplified right-to-left scan line 1404 is corrected to corrected line 1408 which lies half way between the 1406 line preceding and following it. If the left-to-right lines 1406 are straight, the corrected results would consist of a series of straight parallel lines 1502 as shown in FIG. 15. Since left-to-right line 1406 was assumed straight for the calculations but really in this example corresponds to line 901 in FIG. 9 and had a sagging bow, the true corrected scan would depict equally sagging lines 1602, as shown in FIG. 16. This type of distortion, is in the range of 1/10 of a millimeter across the line-scan, and is insignificant. In a preferred embodiment a calibration film or phosphor that has accurate, straight, diagonal lines is used. In this embodiment a separate correction table can be calculated for the left-to-right and right-to-left scan lines, permitting a corrected scan to yield a series of parallel lines 1502 in all cases. Averaging corrections calculated using several diagonal lines aids in eliminating inaccuracies introduced by factors such as transport speed fluctuations. In a preferred embodiment, first and second moveable mirror correction tables are generated for each plate size and resolution combination to be scanned as different page-scan rates and galvanometer swings are involved.

Figure 17:
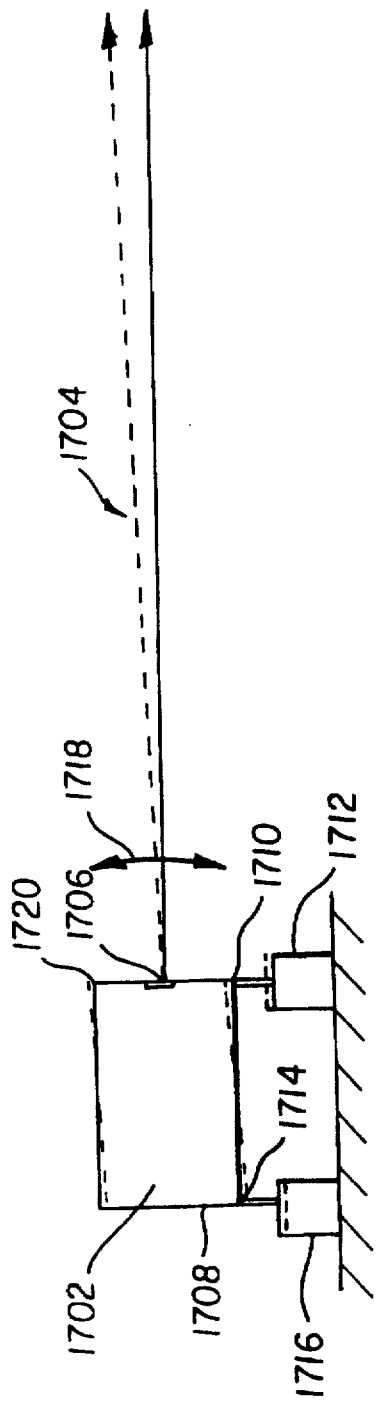
FIG. 17 is a schematic view of a pivoted laser assembly.
Figure 18:
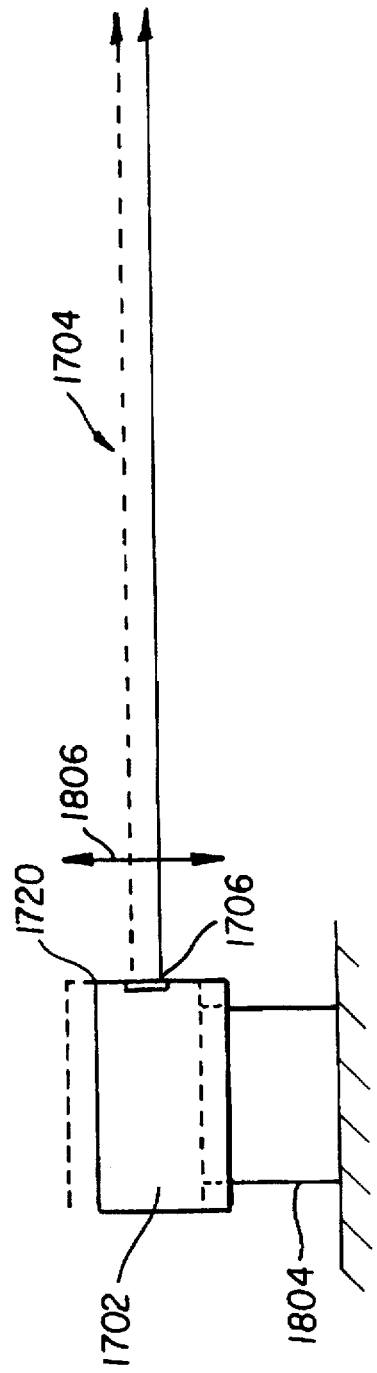
FIG. 18 is a schematic view of a translated laser assembly.

In a preferred embodiment, the page scan axis beam motion in the bow-tie method of scanning and the implementation of correction factors therefore, are effectuated by altering the direction of the beam source itself, as opposed to deflecting the direction of the beam from a stationary source. Apparatus for performing and correcting the above described bow-tie method of scanning is found in FIGS. 17 through 32, and is described hereinafter. In laser aiming, the small beam displacements required for media tracking in the bow-tie scan pattern is accomplished by using positioner(s) such as piezo-electric positioners that act directly on the laser to provide page-scan direction beam displacement. FIGS. 17 and 18 show alternative apparatus for providing media tracking by means of laser aiming. In FIG. 17 there is shown laser assembly 1702, which emits laser beam 1704 from opening 1706 located at first end 1720 of laser assembly 1702. First end 1720 is coupled at first pivot point 1710 to first positioner 1712. Second end 1708 of laser assembly 1702 is coupled at second pivot point 1714 to second positioner 1716. In a preferred embodiment, first and second positioners 1712, 1716 are piezo-electric positioners. Laser assembly 1702 is pivoted to sweep the beam through a one-line pitch displacement at the media by raising or lowering at least one of first positioner 1712 or second positioner 1716, and thereby pivoting beam 1704 through angle 1718. In an alternative embodiment this beam pivoting is effectuated by raising or lowering only one of positioners 1712 or 1716, thereby using pivot point 1710 or 1714 corresponding to stationary positioner 1712 or 1716 solely as a pivot.

In FIG. 18 there is shown laser assembly 1702, which emits laser beam 1704 from opening 1706 located at first end 1720 of laser assembly 1702. Laser assembly 1702 is coupled to positioner 1804. In a preferred embodiment positioner 1804 is a piezo-electric positioner. Laser assembly 1702 is translated sideways through the full line pitch displacement distance to affect the line pitch displacement at the media by raising or lowering positioner 1804 and thereby translating beam 1704 through Δy 1806, in one embodiment this displacement can range up to 171 microns. The required positioner displacements are much smaller if the pivoting technique is used. For example, if the length of the laser diode assembly in FIG. 17 is two inches, then positioner 1712 must rise by about 5 microns (0.0002") as positioner 1716 is lowered by 5 microns to provide a 0.011" beam sweep. Or, alternatively, one positioner 1712 or 1716 is either raised or lowered 10 microns.

Figure 19:
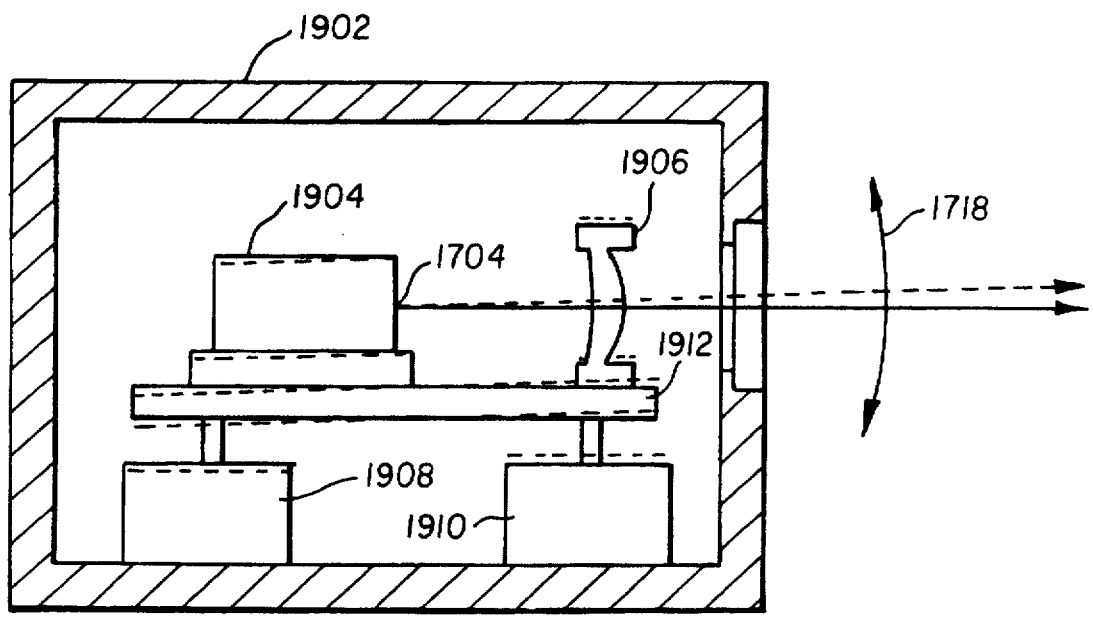
FIG. 19 is a schematic view of a pivoted laser assembly, where the positioners are located within the assembly housing.
Figure 20:
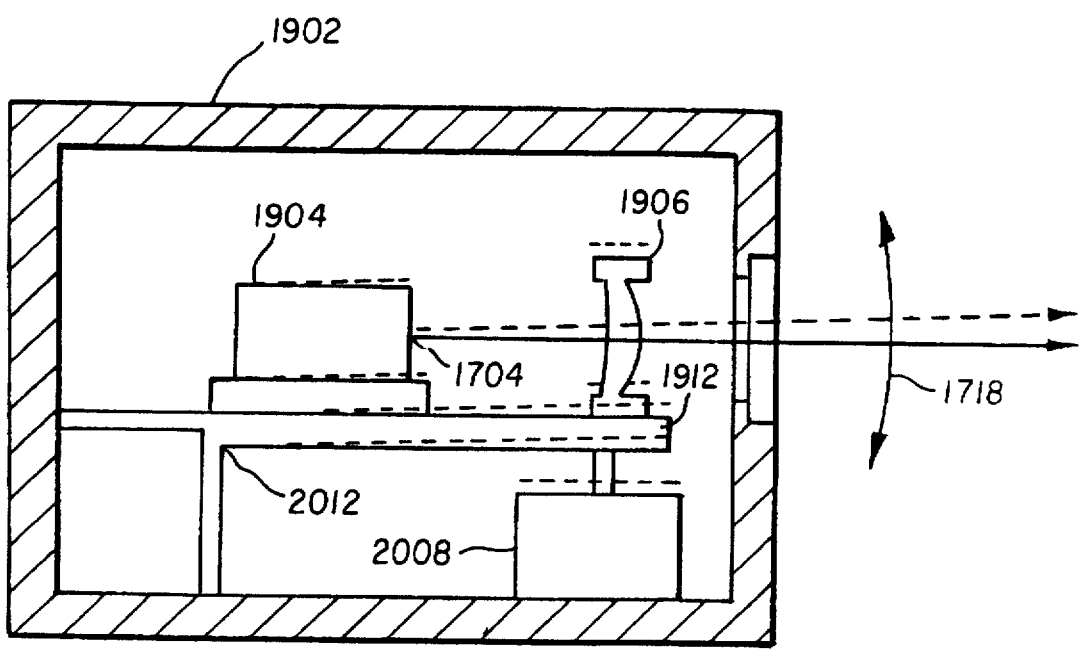
FIG. 20 is a schematic view of a pivoted laser assembly, where the positioner is located within the assembly housing.

FIG. 19 shows still another embodiment of the invention, where the mass of the pivoted parts is significantly reduced. Positioners 1908 and 1910 move only laser diode 1904, lens 1906 and mounting structure 1912 within assembly housing 1902. In this embodiment, beam 1704 is pivoted through angle 1718 by raising or lowering at least one of positioners 1908 or 1910. Similarly, in FIG. 20 positioner 2008 is used to move laser diode 1904, lens 1906 and mounting structure 1912 within assembly housing 1902 and relative to pivot 2012. In this embodiment laser beam 1704 is pivoted through angle 1718 by raising or lowering positioner 2008.

Figure 21:
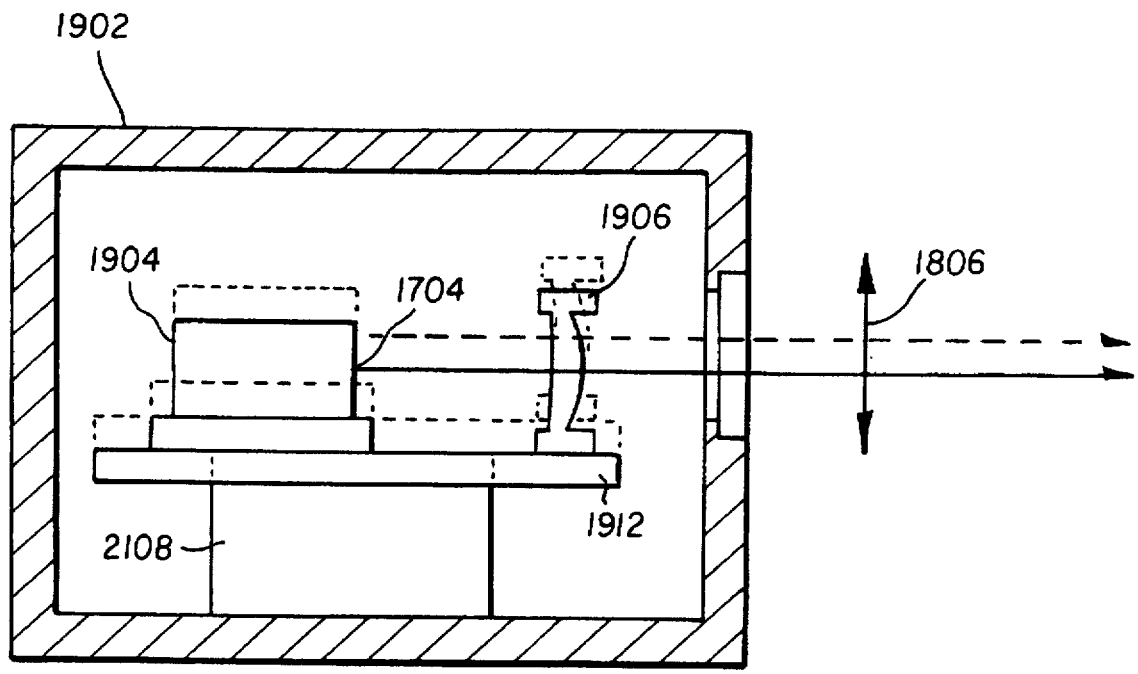
FIG. 21 is a schematic view of a translated laser assembly, where the positioner is located within the assembly housing.

FIG. 21 shows a non-pivoted translation embodiment applied only to the internal components. Again, in this unpivoted design, laser 1904 and lens 1906 travel up to the 171 micron (0,007") maximum line pitch distance but much less force is needed because of the smaller mass involved. Here, positioner 2108 is used to move laser diode 1904, lens 1906 and mounting structure 1912 within assembly housing 1902, thereby translating beam 1704 through Δy 1806.

Figure 22:
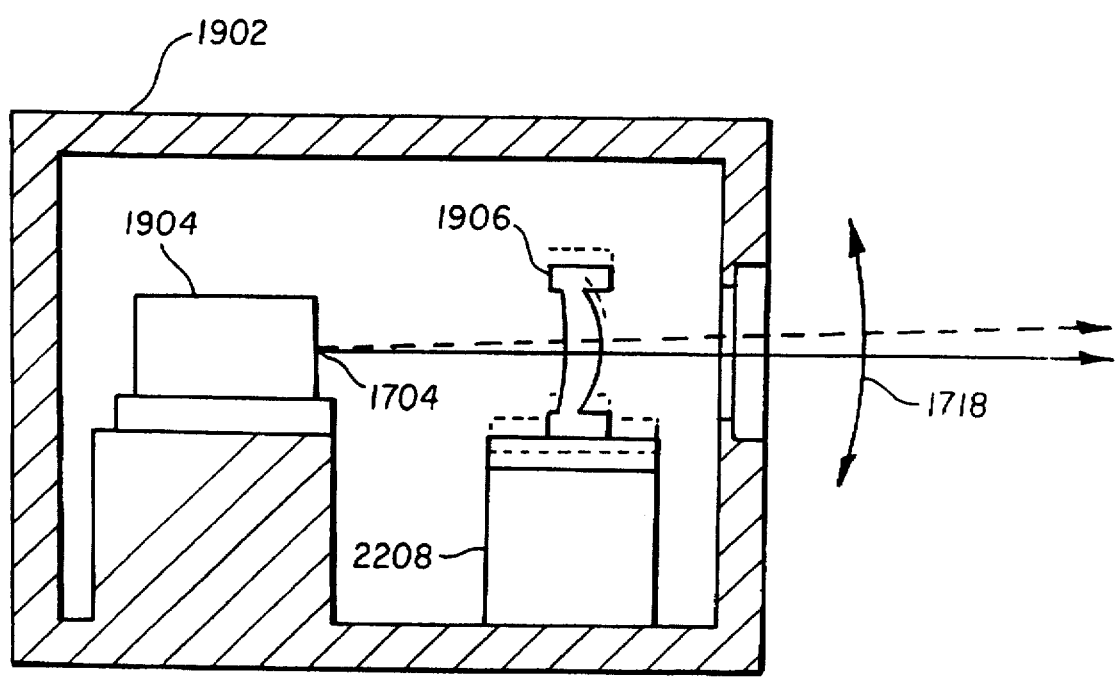
FIG. 22 is a schematic view of a laser assembly, where the positioner is located within the assembly housing, under the lens, to translate the lens thereby pivoting the projected beam.
Figure 23:
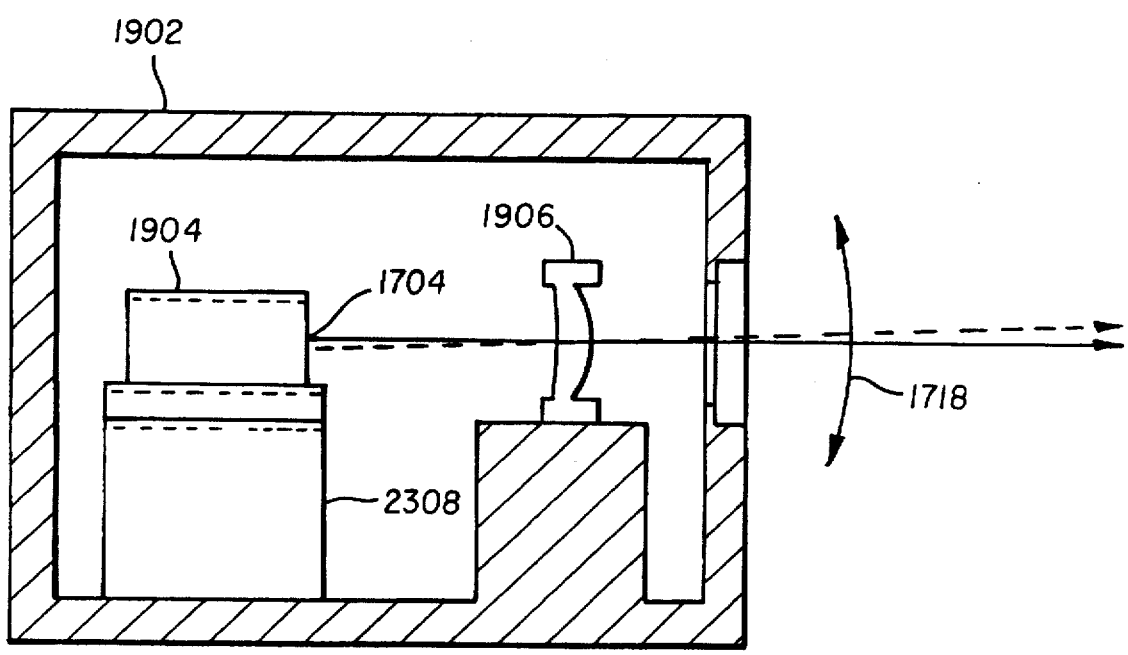
FIG. 23 is a schematic view of a laser assembly, where the positioner is located within the assembly housing, under the laser diode, to translate the diode thereby pivoting the projected beam.

FIGS. 22 and 23 show further embodiments for positioning the beam. In each design the positioner displacement required is in the range of that required for the designs in FIGS. 19 and 20 (5 to 10 microns) and much less than the 171 microns needed for the FIG. 21 design. A benefit of these approaches is that the acceleration forces are again reduced by reducing the mass of the moving components. While the gaussian profile of the beam will be altered slightly as it is pivoted by this technique, the small angles involved yield negligible distortions. In FIG. 22 positioner 2208 is used to move lens 1906, while laser diode 1904 remains stationary, laser diode 1904, lens 1906 and positioner 2208 all being within assembly housing 1902. The repositioning of lens 1906 results in beam 1704 being pivoted through angle 1718. Similarly, in FIG. 23 positioner 2308 is used to move laser diode 1904, while lens 1906 remains stationary. Laser diode 1904, lens 1906 and positioner 2308 all being within assembly housing 1902. The repositioning of laser diode 1904 results in beam 1704 being pivoted through angle 1718.

Figure 24:
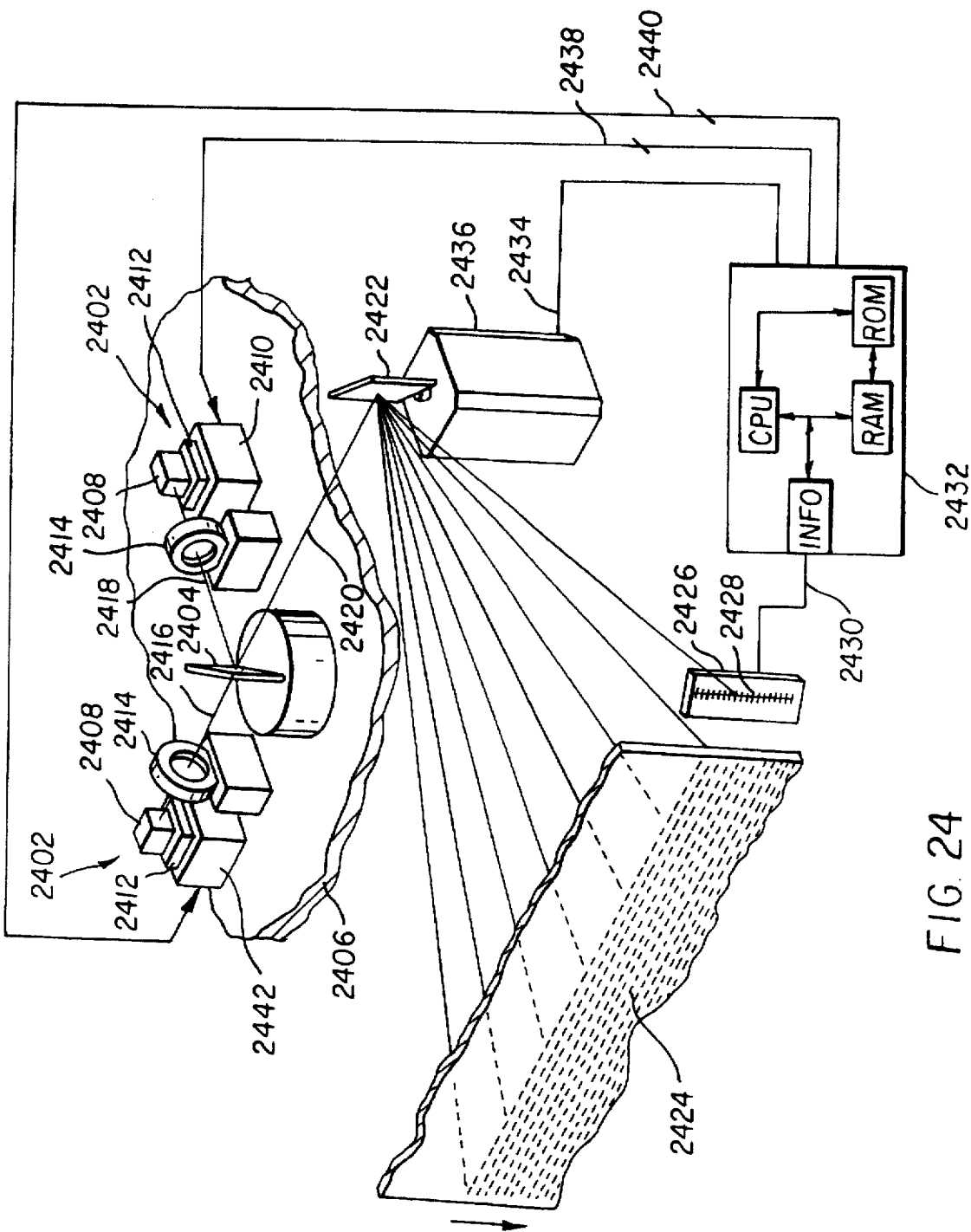
FIG. 24 is a schematic view of a ganged laser assembly.
Figure 25:
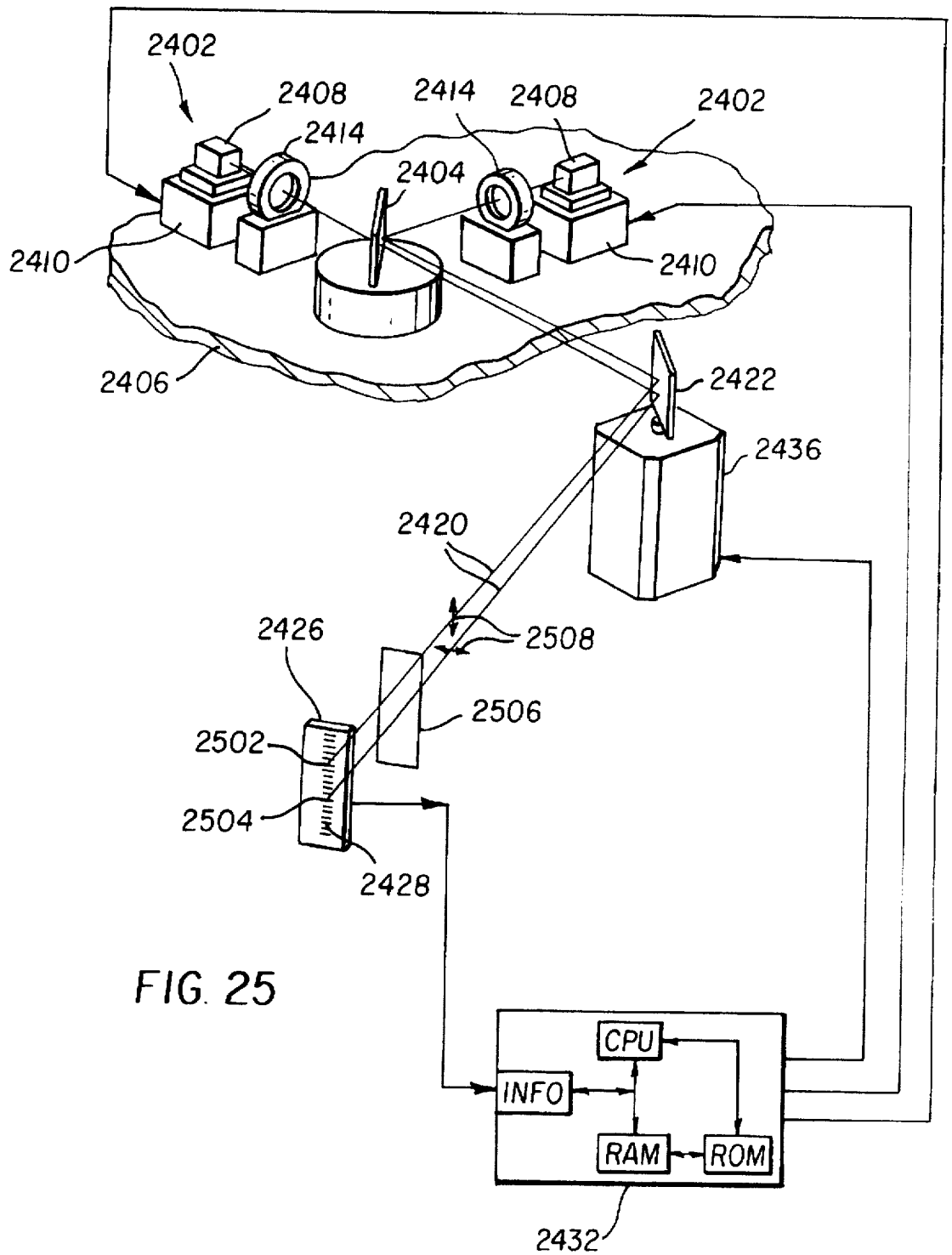
FIG. 25 is a schematic view of a portion of a ganged laser assembly, with page scan misalignment.
Figure 26:
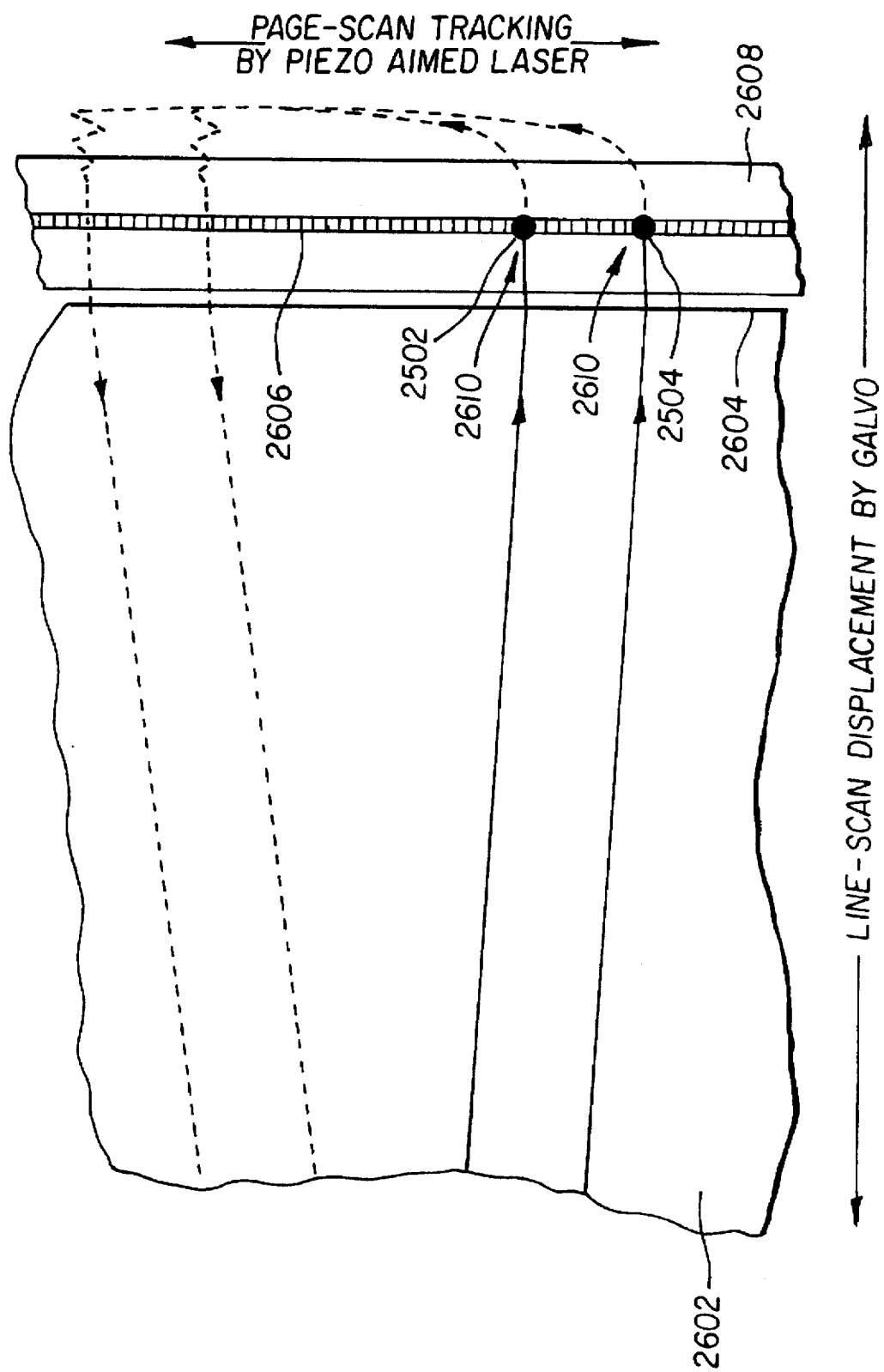
FIG. 26 is an explanatory diagram showing ganged laser diode spot traces with page-scan misalignment.

FIGS. 24 through 26 show the use of this laser aiming technique in a ganged laser assembly. In FIG. 24 two laser systems 2402 and polarized mirror 2404 are on platform 2406. Each laser system includes laser diode 2408, positioner 2410, coupling 2412 and lens 2414. The emissions of each laser diode 2408 are polarized at 90° to the other. Laser systems 2402 and polarized mirror 2404 are positioned on platform 2406 such that mirror 2404 is perpendicular to platform 2406, beam 2416 polarization is parallel to platform 2406, and beam 2418 polarization is perpendicular to platform 2406. Both beams approach and leave mirror 2404 at its polarizing angle. In a preferred embodiment, the combined beams are precisely positioned and become coaxial. Beams 2420 is directed by a moveable mirror such as galvo-mirror 2422 to media 2424. Beam position detector 2426 can be placed to one side of media 2424 to permit checking the alignment of beams 2420. In a first embodiment, this detector consists of a linear CCD array. In a second embodiment, a two-dimensional array is used. FIGS. 24–28 depict linear array 2428. Detector 2426 is used by sweeping combined beam 2420 across linear array 2428. If only one spot is seen crossing the detector we know the lasers are properly aligned at that page-scan aiming position for the lasers.

In the embodiment depicted in FIG. 24, multiple lines 2430 connect controller 2432 to detector 2426; multiple lines 2434 connect controller 2432 to galvanometer 2436 thereby controlling second moveable mirror 2422; multiple lines 2438 connect controller 2432 to positioner 2410, and multiple lines 2440 connect controller 2432 to positioner 2442. After data from detector 2426 is transmitted by way of multiple lines 2430 to controller, feedback corrected control data is transmitted by way of multiple lines 2434, 2438, and 2440, thereby effectuating desired changes in the positioning of moveable mirror 2422 and positioners 2410 and 2442, respectively.

FIG. 25 shows a portion of the ganged laser assembly depicted in FIG. 24. In FIGS. 25 and 26 the two beams are offset in the page-scan direction and will show as two spots 2502, 2504 detected simultaneously as they sweep across the array. After reversing line-scan direction and being shifted to the other extreme of their page-scan tracking, the two spots cross the detector again. In one embodiment, in order to identify which laser is associated with each spot, beam 2420 must sweep across linear array 2428 and back through a second cycle with one of lasers 2402 turned off. Alternatively, in a second embodiment, beam/spot correlation is determined by placing polarizing filter 2506 in front of sensor 2426 to attenuate a large percentage of one beam and a smaller percentage of the other based on beam polarizations 2508. The beams are then differentiated by sensor 2426 based on spot intensity. Once it is known which laser is associated with which spot at the two extremes of the laser aiming sweep (page scan orientation), the correction factors can be calculated for each laser to make the beams coincident at both crossing points on the sensor. If the corrections for the two crossing points are not identical a linear interpolation can be used for intermediate positions.

To actually measure the needed alignment correction along the full aiming cycle of the lasers' positioners, beam 2420 is positioned on detector 2426 while positioned lasers 2402 are at many intermediate deflection positions. In one embodiment this is done by stopping moveable mirror 2422 with beam 2420 aimed at detector 2426 and cycling lasers 2402 through their page-tracking aiming cycle.

In a second embodiment, moveable mirror 2422 is put into a high frequency small angle oscillating mode, which scans beam 2420 across linear array 2428 many times while positioners 2410 and 2442 go through one laser aiming cycle. In either embodiment the needed data can be obtained from detector 2426 to calculate exact aiming alignment correction factors for intermediate deflections.

FIG. 26 depicts the offset beams in further detail. Here, the laser beam sweeps across media 2602, past media edge 2604 to linear sensor array 2606 located on detector 2608. In FIG. 26 the page-scan alignment of the combined beams is off resulting in misaligned beams 2610 yielding spots 2502 and 2504.

Figure 27:
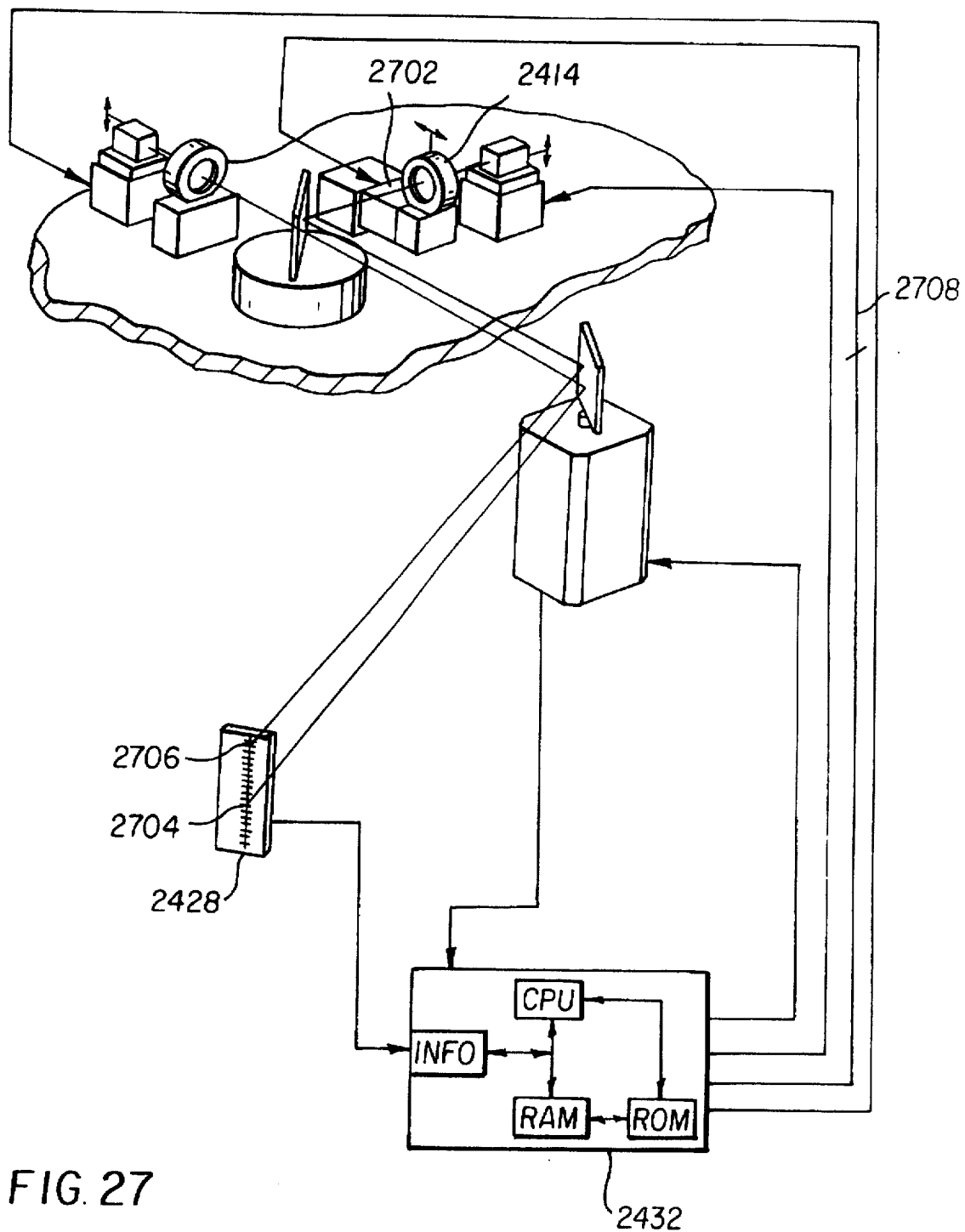
FIG. 27 is an explanatory diagram showing ganged laser diodes with page-scan and line-scan misalignment.
Figure 28:
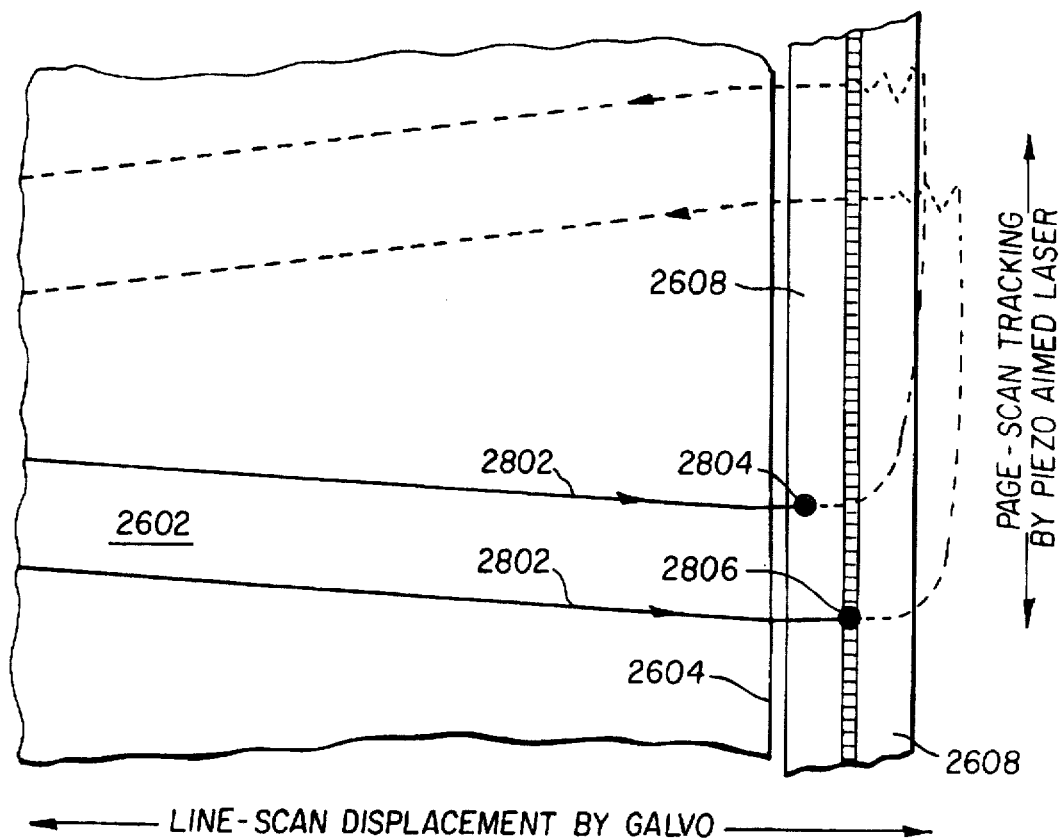
FIG. 28 is an explanatory diagram showing ganged laser diode spot traces with page-scan and line-scan misalignment.

FIGS. 27 and 28 exemplify laser beams misaligned in both the page-scan and line-scan directions. In FIG. 27, horizontal positioner 2702 is added to lens 2414. This allows adjusting the line-scan direction misalignment electromechanically. As first and second spot 2704, 2706 cross linear array 2428, this data is transmitted to controller 2432. A correction factor is calculated by measuring the time delay between when first and second spot 2704, 2706 crossed linear array 2428. This correction factor is transmitted via multiple lines 2708 to horizontal positioner 2702. By either adding or subtracting the proper voltage offset factor to horizontal positioner 2702, the beams can be aligned in the line-scan direction.

FIG. 28 depicts the offset beams in further detail. Here, the beams sweep across media 2602, past media edge 2604 to linear sensor array 2606 located on detector 2608. In FIG. 28 the page-scan and line-scan alignment of combined beams is off resulting in misaligned beams 2802 yielding spots 2804 and 2806.

In one embodiment, line-scan and page-scan correction factor is determined by trial and error, by incrementing the line-scan and page-scan offset corrections until the offsets are eliminated. Alternatively, a two dimensional sensor array could be used to determine the line scan and page scan direction offsets of the beam. This would eliminate the need to calculate line scan direction affect based on crossing time difference. For some applications, it would also permit doing the corrections while the galvo is stopped in a position which deflects the beam to the 2D array where the spots can be adjusted until they coincide to the desired degree.

Figure 29:
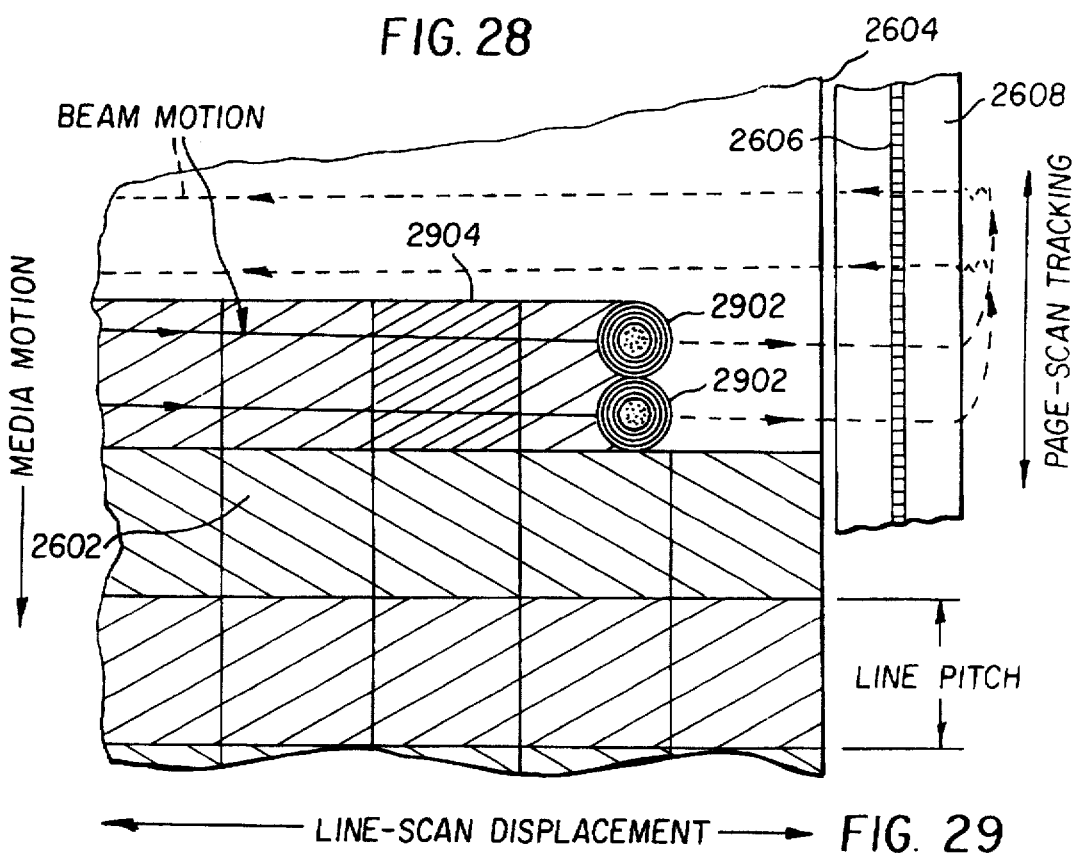
FIG. 29 is an explanatory diagram showing wide-spot, low resolution scanning.

FIG. 29 shows how this type of laser aiming system is used in place of spot size adjusting optics to switch to a "large spot" for low resolution scans in a multiple resolution scanner. For the high resolution scans the two spots are shifted to be spatially coincident. In wide scan-spot, low resolution scanning the laser beams are purposefully mispositioned resulting in two spots positioned side by side 2902. The spot size in the line-scan direction is effectively "enlarged" by increasing the time increment during which data is collected for each pixel 2904. As with high resolution scanning, positioning of laser beams is effectuated by sweeping the beams across media 2602, past media edge 2604 to linear sensor array 2606 located on detector 2608. With two ganged lasers, a 2:1 effective spot diameter adjustment range is possible. In an embodiment with four ganged lasers, a 4:1 spot diameter adjustment range is possible. One example of where widening the beam for lower resolution scanning would be useful is when the same system is used to scan 8×10" x-ray screens and 14×17" x-ray screens, and where the same total pixel resolution is desired for each scan. With wide scan-spot low resolution scanning the same amount of data can be acquired from the 14×17" x-ray screen as is acquired from the 8×10" screen using normal spot scanning parameters.

Figure 30:
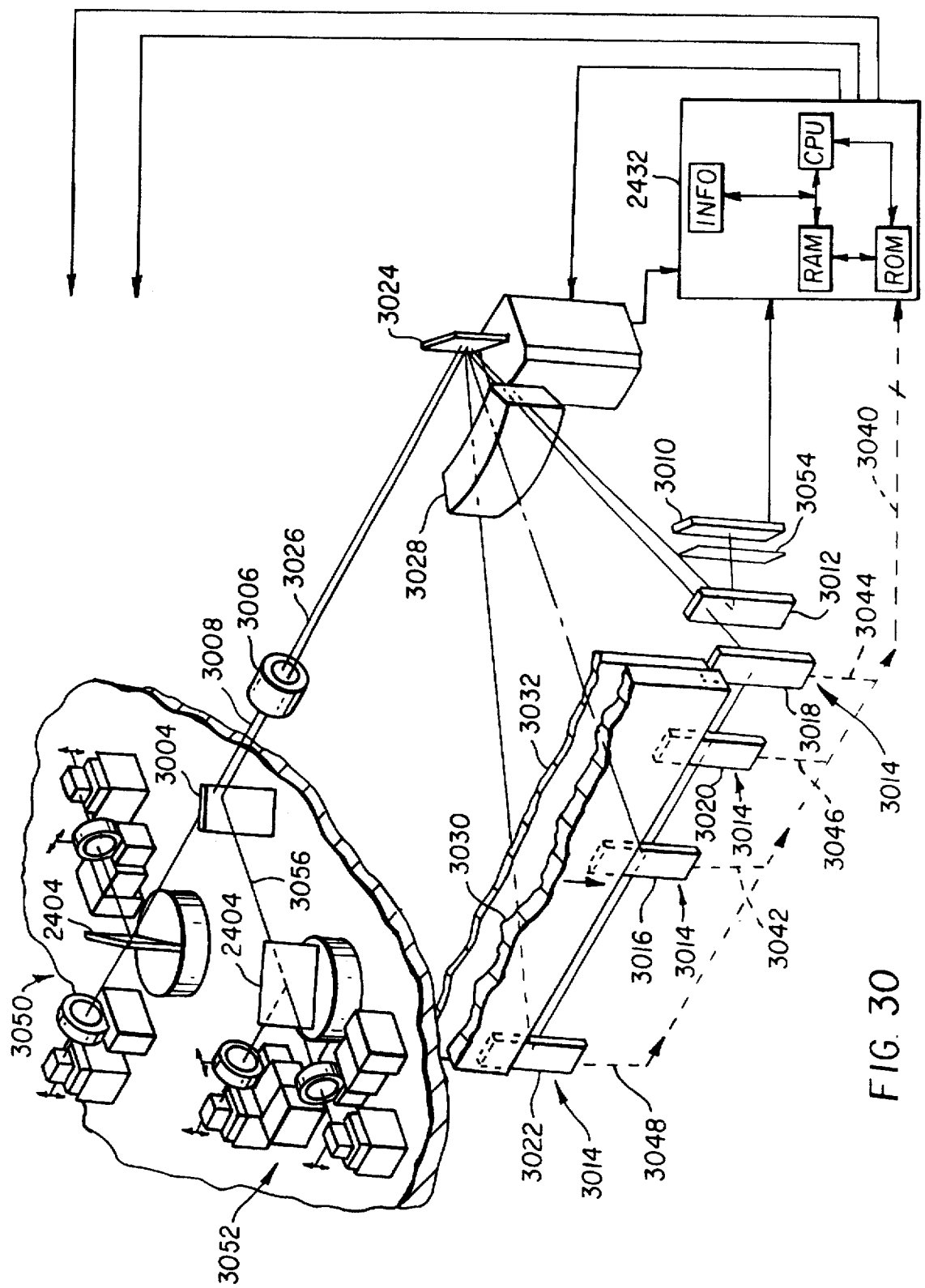
FIG. 30 is a schematic view of a four beam aimed laser system.

To add additional beams together knife edge mirror assembly 3004 of the type shown in FIG. 30 can be used to bring collimated beams 3008 into close parallel alignment.

If the collimated beams are parallel, beam focusing lens 3006 will focus the beams to a common spot.

FIG. 30 is a schematic view of a four beam aimed laser. In FIG. 30 the outputs of two sets of polarized lasers are combined, as previously described, by polarized mirrors 2404. The two resulting beams are in turn brought into close parallel paths by knife edge mirror assembly 3004. Beam focusing lens 3006 then focuses "two" parallel beams 3008 (really four beams) to a common focus. Second mirror 3024 directs this focused beam 3026 through f-theta lens 3028, which directs focused beam 3026 to scanning stage 3030. In further embodiments, the knife edge mirror technique is used to combine the beams of additional lasers. In one such embodiment, the outputs of two laser assemblies of the type shown in FIG. 30 are combined by an additional knife edge mirror so that the beam focusing lens brings eight beams to a common focus.

Turning to a further embodiment of the invention shown in FIG. 30, fixed beam position detector 3010 is located on the right side of the edge of the media. In FIG. 30, knife edge mirror 3012 deflects the beam to the detector, thereby reducing the amount of overscan required by the galvanometer to get the beam to the active elements on the detector and avoiding interference between the edge of the phosphor plate and detector. In an embodiment using a KESPR style cassette, the detector must clear the lead edge extrusion and attached extractor mechanism. Four other detectors 3014 attached to the lead edge of the stage are shown in FIG. 30. These detectors are mounted to be coplanar with phosphor plate surface 3032. While all detectors shown could be used to advantage, at least first detector 3016 and one edge detector 3018 or 3022 are needed to permit the easy generation and verification of the beam coincidence correction of the type shown in FIG. 32. In a preferred embodiment, first detector 3016 and edge detector 3018 are used. With the detectors mounted at the lead edge of the stage, corrections are calculated and confirmed prior to the start of the plate scan. The advantage of using the fixed beam-position detector on the edge of the plate is that the stability of the beam alignment at the edge of the media can also be monitored during the scan. In another embodiment, third detector 3020 between first detector 3016 and edge detector 3018 adds data useful in generating the nonlinear coincidence correction between the center and edge detectors. For coincidence correction calculations the exact position for third detector 3020 is not too critical as long as it is roughly halfway to one quarter of the way between the edge of the media and first detector 3016, and so long as the position of third detector 3020 is known. It would be advantageous however to place it at the point to which beam focusing lens 3006 will be focused at setup.

Data from any or all of detectors 3016, 3018, 3020, or 3022 may be transmitted via multiple lines 3042, 3044, 3046, or 3048, respectively, to multiple lines 3040 to controller 2432.

FIGS. 30–31 depict collimated beams 3008 being focused by focusing lens 3006 and being directed by second mirror 3024. The beams are focused to a minimum spot size and aligned forming coincident beam 3102 at media edge 3106. By focusing the beams in such a manner, at midpoint the beams are not at best focus and are offset from each other, such as offset beam 3104.

FIG. 32 depicts an embodiment of how a system is focused to achieve the best overall focus appearance for the various images to be produced by the scanner. Here, the focus is closer to the "preferred path of Best Focus" 3202, as opposed to the "path of Best Focus" 3206, the maximum blur of individual spots being cut approximately in half at midpoint 3208.

Once the optimum position for this preferred path of Best Focus 3202 is determined in the design process, positioning third detector 3020 at the point where this curve crosses media surface 3204 provides the ability to use that detector during assembly or field repairs to adjust the beam focusing lens to its optimum focus by minimizing individual beam spot size on this detector.

The depth of focus of a beam or bundle of beams is inversely proportional to the diameter of the collimated beam or beam bundle. The depth of focus for a bundle of beams will generally be a small fraction of the depth of focus of each individual beam. Where the lens is focused and spots are made coincident at the edge of the media, as in FIG. 31, as the second mirror 3024 rotates and the coincident spots sweep toward the middle of the flat media, the individual spots move apart from each other and become larger as they shift away from their best focus point. Once the beam scans past the midpoint of the media (assuming second mirror 3024 is centered) the focus starts to improve again and the spots start getting closer again. By keeping the relative positions of the spots constant (i.e. superimposed for a minimum spot size application) as they sweep across the media, much of the depth of focus problem would be eliminated for a ganged laser system. FIG. 32 illustrates this dynamic alignment concept for reducing spot size variation as the beam sweeps across the media. While the necessary dynamic alignment correction needed during the sweep could be theoretically calculated, or determined by a manual calibration at set-up, the approach shown in FIG. 30 is more practical and permits automatic recalibration at the start of each scan.

As depicted in FIG. 25, a polarizing filter 2506 can be used to permit differentiating the beam origins based on the transmitted spot intensity on detector 2426. A similar approach can be used in a four laser system of the type shown in FIG. 30. In this embodiment, one of the polarized laser ganging subassemblies 3050 or 3052 is rotated approximately 45° about the axis of its combined beam. The four beams are then differentiated by detectors 3016, 3018, 3020, 3010 or 3022 which have a properly oriented polarizing filter located in front of them. Filter 3054 is an example of such a filter located in front of fixed beam position detector 3010.

Figure 33:
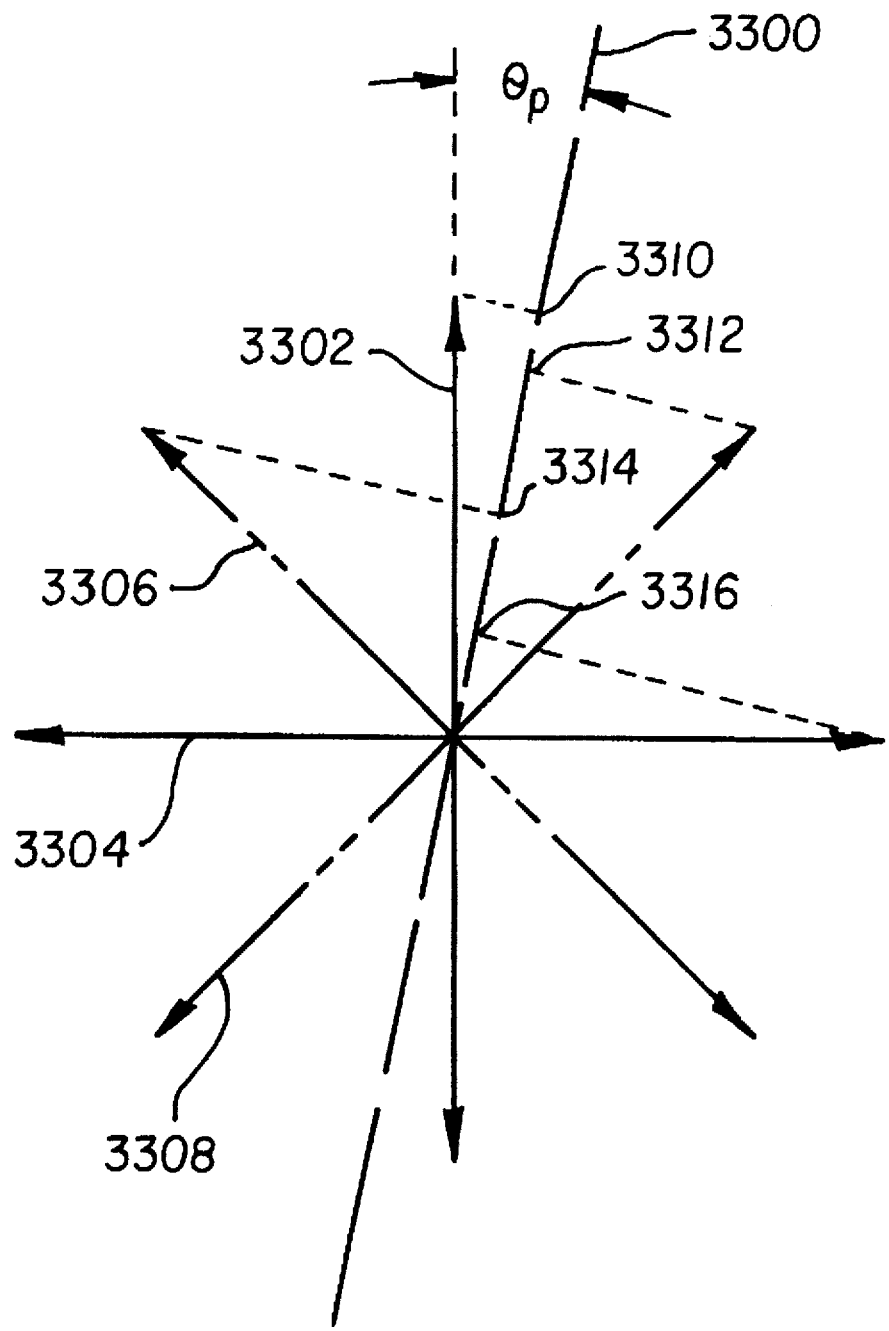
FIG. 33 is an explanatory diagram showing the relative orientations of beam polarization, the angle of the filter polarization relative to the orientation of a first beam and the resulting intensity levels of each beam after attenuation.

FIG. 33 depicts the relative orientations of beam polarizations, the angle of the filter polarization relative to the orientation of one beam and the resulting intensity levels of each beam. Subassembly 3050 (FIG. 30) emits beams of polarizations 3302 and 3304. Subassembly 3052 (FIG. 30) emits beams 3306 and 3308. Line 3300 represents the desired polarization of a filter that can differentiate the beams based on the intensity reaching the detector. Filter polarization depicted by line 3300 is at angle θp to the orientation of the polarization of one of the beams, such as beam of polarization 3302. In one embodiment this angle is approximately 11.25°. In the example depicted in FIG. 33, polarized laser subassembly 3052 of FIG. 30 has been rotated by 45° about beam axis 3056. If all beams are originally of equal intensity, after passing through filter 3054 the intensity of beam of polarization 3302 is attenuated to first level 3310, beam 3304 is attenuated to fourth level 3316, beam 3306 is attenuated to third level 3314 and beam 3308 is attenuated to second level 3312 as measured by detector 3010. In a preferred embodiment a filter such as filter 3054 is placed in front of each detector 3016, 3018, 3020, 3022 at the lead edge of the stage (FIG. 30).

If more than 4 lasers are ganged and/or if the beams are not polarized, other methods are used to identify the beam origins and correct the alignment. One such method is to temporarily set the "n" beams to "n" different differentiable intensities by adjusting individual laser power outputs. This power output differentiation would be necessary while scanning across lead edge detectors 3014 or fixed beam position detector 3010. While scanning on the media each laser would adjust to maximum sustainable power.

As previously mentioned in one embodiment of the invention, beam alignment of two beams is achieved through trial and error. This technique is also useful in systems having greater than two beams. In three or more beam systems trial corrections can be tried on two beams at a time by making one, for instance, in the line-scan direction and one in the page-scan direction. The before and after pattern of the spot array yields the needed information to correct each of those trial beams to best alignment. Two or more beams can then be corrected in the same way to the same alignment target point as the first two, and so forth until all beams have been aligned.

Although the invention has been described in detail for the purpose of illustration, it is understood that such detail is solely for that purpose, and variations can be made therein by those skilled in the art without departing from the spirit and scope of the invention, which is defined by the following claims.

PARTS LIST

100 Laser
102 Beam
104 Stationary mirror
106 Piezo-electric mirror
108 Galvanometer mirror
110 First control bus
112 Second control bus
114 Third control bus
116 Controller
118 Galvanometer
120 Media driver
122 Lens
124 Media
210 Deflection
302 Bow-tie pattern
304 Height
306 Width
308 First edge
312 Opposing edge
314 Media travel
316 Full bow-tie cycle
318 First location
320 Second location
322 Third location
324 Fourth location
350 Image
402 Adjacent lines
404 Narrow vertical features
406 Fine vertical features
408 Lines
410 Offset position errors
502 Repetitive position errors
602 Scan lines
702 Calibration grating
704 Storage phosphor sheet
706 Screen
802 Zigzag energy troughs
901 First scan trace
902 Second scan trace
904 Trace
906 Diagonals
1002 y position
1004 $\Delta y$ increment
1006 $Y_1$
1102 Straight left-to-right trace
1104 $Y_1$ position
1106 20x scan trace
1108 x position of points
1110 Intersection points
1112 Left-to-right 20x trace
1114 10 times $\Delta y$
1202 Scan data
1204 Copies
1302 Right-to-left scan lines
1304 Left-to-right scan lines
1402 Correction factor
1404 Right to left scan lines
1406 Left-to-right scan lines
1408 Corrected line
1502 Parallel lines
1602 Equally sagging lines
1702 Laser assembly
1704 Laser beam
1706 Opening
1708 Second end
1710 First pivot point
1712 First positioner
1714 Second pivot point
1716 Second positioner
1718 Angle
1720 First end
1804 Positioner
1806 $\Delta y$
1902 Assembly housing
1904 Laser diode
1906 Lens
1908 Positioner
1910 Positioner
1912 Mounting structure
2008 Positioner
2012 Pivot
2108 Positioner
2208 Positioner
2308 Positioner
2402 Laser systems
2404 Polarized mirror
2406 Platform
2408 Laser diode
2410 Positioner
2412 Coupling
2414 Lens
2416 Beam
2418 Beam
2420 Beams
2422 Galvo-mirror
2424 Media
2426 Detector
2428 Linear array
2430 Multiple lines
2432 Controller
2434 Multiple lines
2436 Galvanometer
2438 Multiple lines
2440 Multiple lines
2442 Positioner 2502 Spot
2504 Spot
2506 Polarizing filter
2508 Beam polarizations
2602 Media
2604 Media edge
2606 Linear sensor array
2608 Detector
2610 Misaligned beams
2702 Horizontal positioner
2704 First spot
2708 Multiple lines
2802 Misaligned beams
2804 Spot
2806 Spot
2902 Two spots positioned side by side
2904 Pixel
3004 Knife edge mirror assembly
3006 Focusing lens
3008 Collimated beams
3010 Fixed beam position detector
3012 Knife edge mirror
3014 Detectors
3016 First detector
3018 Edge detector
3020 Third detector
3022 Edge detector
3024 Second mirror
3026 Focused beam
3028 f-theta lens
3030 Scanning stage
3032 Phosphor plate surface
3040 Multiple lines
3042 Multiple lines
3044 Multiple lines
3046 Multiple lines
3048 Multiple lines
3050 Polarized laser ganging subassembly
3052 Polarized laser ganging subassembly
3054 Filter
3056 Beam axis
3102 Coincident beam
3104 Offset beam
3106 Media edge
3202 Preferred Path of Best Focus
3204 Media surface
3206 Path of Best Focus
3208 Midpoint
3300 Line
3302 Beams of polarizations
3304 Beams of polarizations
3306 Beams
3308 Beams
3310 First level
3312 Second level
3314 Third level
3316 Fourth level

What is claimed is:

1. An apparatus for aiming a laser system comprising one or more moveable components including a laser source and a lens, while scanning a media with a beam, wherein said laser emits said beam, comprising:

means for moving said media continuously along a media path in one direction while said beam travels along a bow-tie path defined by a route that returns said beam to its initial position;

means for effectuating movement of said beam by altering the position of at least one of said movable laser components;

means for initiating movement of said beam from a line start location on a first edge of said media and moving said beam across said media to a second, opposite edge in a direction transverse to said media path;

means for moving said beam at a second edge of said media in a direction of travel opposite that of said media path, a distance approximate to a desired line spacing of said media;

means for moving said beam transverse to said media path to return said beam to said first edge;

means for moving said beam along said first edge of said media in said direction of travel opposite that of said media path to return said beam to said line start location at said first edge, whereupon the aforementioned cycle is repeated a plurality of times until said media is scanned; and means for combining at least two said lasers, wherein said combination forms a ganged laser assembly.

2. An apparatus for aiming a laser according to claim 1, wherein each said beam forms a spot, said spot having a spot size, further comprising:

means for measuring vertical and horizontal displacements of said beams; and means for correcting vertical and horizontal displacements of said beams.

3. An apparatus for aiming a laser according to claim 1, further comprising:

means for combining said beams.

4. An apparatus for aiming a laser according to claim 3, wherein said combining a plurality of beams results in one spot.

5. An apparatus for aiming a laser according to claim 3, further comprising:

means for measuring alignment of said beams.

6. An apparatus for aiming a laser according to claim 5, wherein said means for determining alignment of said beams further comprises:

means for sweeping said beams across a detector; and means for sensing number of spots.

7. An apparatus for aiming a laser according to claim 6, wherein the number of beams is greater than one, said apparatus further comprising:

means for identifying which laser is associated with which spot.

8. An apparatus for aiming a laser according to claim 7, wherein said means for identifying which laser is associated with which spot step further comprises:

means for turning off one laser; and means for sweeping said beam across said detector.

9. An apparatus for aiming a laser according to claim 7, wherein said means for identifying which laser is associated with which spot step further comprises:

means for placing a filter in front of a sensor, wherein said filter attenuates a differing percentage of each said beam; and means for differentiating said beams, wherein said differentiation is based on beam intensity.

10. An apparatus for aiming a laser according to claim 7, said apparatus further comprising:

means for aligning beams, wherein said means for aligning comprises:

means for sensing location of each spot;

means for calculating correction factors required for a plurality of spots to become one spot; and means for applying said correction factors to said beams; wherein said means for aligning laser beams repetitively aligns said beams until said beams are properly aligned.

11. An apparatus for aiming a laser according to claim 10, wherein said correction factors are based upon linear interpolation.

12. An apparatus for aiming a laser according to claim 10, further comprising:

means for measuring alignment correction of two or more beams.

13. An apparatus for aiming a laser according to claim 12, wherein said means for measuring alignment of two or more beams further comprises:

means for positioning beams on detector;

means for varying positions of at least one laser;

means for generating signals in response to said varying laser positions; and means for calculating aiming alignment correction factors.

14. An apparatus for aiming a laser according to claim 13, wherein said means for generating signals comprises:

means for directing said beams to a detector;

means for scanning said beams across said detector a plurality of times; and means for running said laser beams through at least one said bow-tie path.

15. An apparatus for aiming a laser according to claim 14, said method further comprising:

means for correcting alignment, wherein said correction further comprises:

means for adjusting line-scan direction;

means for measuring time delay between the crossing of a first and second spot across a detector;

means for calculating a correction factor; and means for adding or subtracting said correction factor to a positioner, wherein said positioner alters alignment of said beam.

16. An apparatus for aiming a laser according to claim 14, wherein said detector comprises a linear array.

17. An apparatus for aiming a laser according to claim 15, further comprising:

means for reducing variation of said spot size.

18. An apparatus for aiming a laser according to claim 17, wherein said means for reducing spot size variation comprises:

means for directing said beams to at least one detector;

means for generating detector signals representative of said spot size; and means for altering the focus of said beams in response to said detector signals.

19. An apparatus for aiming a laser according to claim 17, wherein said apparatus is used in said ganged laser assembly to achieve wide scan line, low resolution scans, said apparatus further comprising:

means for shifting laser spots to be positioned side by side; and means for increasing the time increment during which data is collected for each pixel.

20. An apparatus for aiming a laser according to claim 1, further comprising:

means for adding additional beams to said ganged laser assembly.

21. An apparatus comprising:

a ganged laser system having at least two laser systems, each laser system having an assembly housing, each assembly housing containing:

a laser diode;

a lens;

a support, wherein said laser diode emits a beam for generating a spot of light on a media, said beam passing through said lens and continuing through an opening in a first end of said assembly housing; and means for moving at least one of said laser diode and lens, said ganged laser assembly further comprising:

means for directing beams in a vertical direction;

means for correcting beam motion in a vertical direction;

means for directing at least one beam in a horizontal direction;

means for correcting beam motion line-scan direction;

means for measuring time delay between the crossing of a first and second spot across a linear array;

means for calculating a correction factor; and means for adding or subtracting said correction factor to said line scan positioner, wherein beams from at least two ganged laser assemblies are combined, said apparatus further comprising:

means for directing beams resulting from each ganged laser assembly; and means for focusing said beams to a common point.

22. An apparatus according to claim 21, further comprising:

means for reducing variation of spot size.

23. An apparatus according to claim 22, wherein said means for reducing spot size variation comprises:

means for directing said beams to at least one detector;

means for generating detector signals representative of said spot size; and means for altering the focus of said beams in response to said detector signals.

24. An apparatus according to claim 21, further comprising:

means for achieving wide scan line, low resolution scans.

25. An apparatus according to claim 21, wherein said means for achieving wide scan-line low resolution scans further comprising:

means for shifting laser spots to be positioned side by side; and means for increasing the time increment during which data is collected for each pixel.

* * * * *